(12) United States Patent
Guo et al.

(10) Patent No.: US 9,384,502 B2
(45) Date of Patent: Jul. 5, 2016

(54) TECHNIQUES FOR ORGANIZING AND PRESENTING DEAL CONTENT

(75) Inventors: Jiacheng Guo, Beijing (CN); Li He, Beijing (CN); Sen Liu, Beijing (CN)

(73) Assignee: Excalibur IP, LLC, Sunnyvale, CA (US)

(*) Notice: Subject to any disclaimer, the term of this patent is extended or adjusted under 35 U.S.C. 154(b) by 0 days.

(21) Appl. No.: 13/814,714

(22) PCT Filed: Jun. 29, 2012

(86) PCT No.: PCT/CN2012/000905
§ 371 (c)(1),
(2), (4) Date: Feb. 6, 2013

(87) PCT Pub. No.: WO2014/000131
PCT Pub. Date: Jan. 3, 2014

(65) Prior Publication Data
US 2015/0100437 A1    Apr. 9, 2015

(51) Int. Cl.
*G06Q 30/00* (2012.01)
*G06F 17/00* (2006.01)
*G06Q 30/02* (2012.01)
(Continued)

(52) U.S. Cl.
CPC ...... *G06Q 30/0277* (2013.01); *G06F 17/30864* (2013.01); *G06Q 10/107* (2013.01); *G06Q 30/0224* (2013.01); *G06Q 30/0255* (2013.01); *G06Q 30/0267* (2013.01); *G06Q 30/0276* (2013.01)

(58) Field of Classification Search
CPC .................................................. G06Q 30/0255
USPC ........................................................ 705/14.53
See application file for complete search history.

(56) References Cited

U.S. PATENT DOCUMENTS

| | | | | |
|---|---|---|---|---|
| 5,806,044 A | * | 9/1998 | Powell | 705/14.39 |
| 7,844,489 B2 | * | 11/2010 | Landesmann | G06Q 20/20 |
| | | | | 705/14.1 |
| 2002/0188689 A1 | * | 12/2002 | Michael | 709/206 |

(Continued)

FOREIGN PATENT DOCUMENTS

| | | |
|---|---|---|
| CN | 101441744 A | 5/2009 |
| CN | 101663684 A | 3/2010 |
| WO | WO0190944 A1 | 11/2001 |

OTHER PUBLICATIONS

Lawler, "With a Beautiful New Redesign, Unroll.me Comes Out of Beta to Roll Up All Your Junk Email Subscriptions", TechCrunch, Jun. 13, 2012, on line at techcrunch.com/2012/06/13/unrollme-redesign/.*

(Continued)

*Primary Examiner* — Amanda Abrahamson
*Assistant Examiner* — Scott C Anderson
(74) *Attorney, Agent, or Firm* — James J. DeCarlo; Greenberg Traurig LLP

(57) ABSTRACT

Techniques for organizing and presenting deals/commercial offers received by users in emails are provided. Emails directed to a user that contain commercial offers for the user are determined. The determined emails are stored in a deal folder for the user. A deal newsletter is generated that at least summarizes commercial offers contained in at least a portion of the emails stored in the deal folder. The deal folder may be displayed to show the user the received deal emails. Furthermore, the deal newsletter may be displayed to the user to summarize the received deals for the user.

18 Claims, 10 Drawing Sheets

(51) Int. Cl.
*G06F 17/30* (2006.01)
*G06Q 10/10* (2012.01)

(56) References Cited

U.S. PATENT DOCUMENTS

2007/0226082 A1 9/2007 Leal
2008/0077504 A1* 3/2008 Gausebeck ............ G06Q 30/02
 705/26.1
2012/0047014 A1 2/2012 Smadja et al.
2013/0117098 A1* 5/2013 Madsen ............. G06Q 30/0202
 705/14.39

OTHER PUBLICATIONS

International Search Report corresponding to PCT/CN2012/000905 filed Jun. 29, 2012.
Written Opinion of the International Searching Authority corresponding to PCT/CN2012/000905 filed Jun. 29, 2012.

* cited by examiner

402 transmit deal folder information to a computing device of the user to enable display of the deal folder to the user at the computing device

TECHNIQUES FOR ORGANIZING AND PRESENTING DEAL CONTENT

BACKGROUND OF THE INVENTION

1. Field of the Invention

The present invention relates to online deals and incentives.

2. Background

For many years, customers have been able to shop for products and services. Traditionally, a customer has been able to purchase a product or service from a merchant. The merchant may occasionally offer discounts on their products and/or services. Such discounts may benefit customers with lower prices, and may benefit merchants by enabling increased sales volumes, enabling excess inventory to be reduced, and providing further benefits.

In recent years, the Internet has provided a new medium for customers to purchase products and services from merchants. For example, thousands of electronic commerce websites such as amazon.com, provided by Amazon.com, Inc. of Seattle, Wash., and ebay.com, provided by eBay Inc. of San Jose, Calif., have been established that sell products and services over the Internet. The availability of products and services for sale over the Internet has made shopping more convenient for customers and enabled merchants to reach larger numbers of customers.

Some websites have recently been provided online that provide commercial offers for discounted products and services to groups of users. Examples of such websites, referred to as "deal sites," include www.groupon.com provided by Groupon, Inc. of Chicago, Ill. and livingsocial.com provided by LivingSocial Inc. of Washington, D.C. These deal sites typically email commercial offers in the form of coupons. A deal site typically emails a coupon to members of the deal site, and the coupon is activated if a predetermined minimum number of persons sign up for the deal offered by the coupon.

Such deal sites have disadvantages. For example, users that are members of deal sites receive large numbers of emails continuously from these deal sites, which in some cases amounts to multiple emails received from a single deal site each day. The users spend time reviewing each of these received emails in the hopes that they may find a relevant deal. Furthermore, such deal sites currently target users with deals that are not relevant to the users, or are based on basic user characteristics such as demographics or city-level locations. As such, the inboxes of users become very full and cluttered with deal-related emails that the users may or may not be interested in.

BRIEF SUMMARY OF THE INVENTION

Various approaches are described herein for, among other things, organizing commercial offers for users. Emails directed to a user that contain commercial offers may be stored in a deal folder for the user. A deal newsletter is generated that summarizes the commercial offers contained in the deal folder. The deal folder may be displayed to show the user the received deal emails. Furthermore, the deal newsletter may be displayed to the user to summarize the received deals for the user.

In one method implementation, a second plurality of emails is determined from a first plurality of emails directed to a user. The determined emails contain commercial offers for the user. The determined emails are automatically stored in a deal folder for the user. A deal newsletter is generated that summarizes commercial offers contained in at least a portion of the determined emails stored in the deal folder.

Deal folder information may be transmitted to a computing device of the user to enable display of the deal folder to the user at the computing device. Furthermore, a user may interact with a user interface at the computing device to transmit a request to a server for the deal newsletter. The deal newsletter may be generated by the server in response to the request. The deal newsletter may be transmitted to the computing device for display to the user.

In another implementation, a commercial offer presentation system is provided. The system includes a deal manager and a deal newsletter generator. The deal manager manages a set of emails containing commercial offers directed a user. The deal newsletter generator generates a deal newsletter for the user that at least summarizes commercial offers contained in at least a portion of the emails.

The deal newsletter generator may include one or more of a deal summary page generator, a map page generator, a mail page generator, and a deal search interface page generator.

The deal summary page generator generates a deal summary page of the deal newsletter that includes a plurality of deal summary sections. Each deal summary section includes commercial offer information extracted from a corresponding email of the set of emails.

The map page generator generates a map page of the deal newsletter that indicates a location associated with a commercial offer contained in an email stored in the deal folder.

The mail page generator generates a mail page of the deal newsletter that includes a plurality of deal summary snapshots in a first portion of the mail page. Each deal summary snapshot includes commercial offer information extracted from a corresponding email of the set of emails, and each deal summary snapshot is selectable to enable display of the corresponding email in a second portion of the mail page.

The deal search interface page generator generates a deal search page of the deal newsletter that includes a search interface that enables a user to search commercial offers contained in emails stored in the deal folder.

The system may further include a deal source interface that receives commercial offers from at least one additional commercial deal source (e.g., a partner feed, a web crawler, etc.), and stores the received plurality of commercial offers in an additional deal database. The deal newsletter generator may generate the deal newsletter to include at least one commercial offer selected from the commercial offers stored in the additional deal database.

The system may further include a deal enhancer that modifies display of an email selected for display by overlaying additional deal-related information on the displayed selected email.

Still further, the system may include a deal ranker that ranks commercial offers contained in the emails.

Computer program products are also described herein that enable the organizing of commercial offers in a deal folder, the generating of a deal newsletter, as well as enabling further embodiments described herein.

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
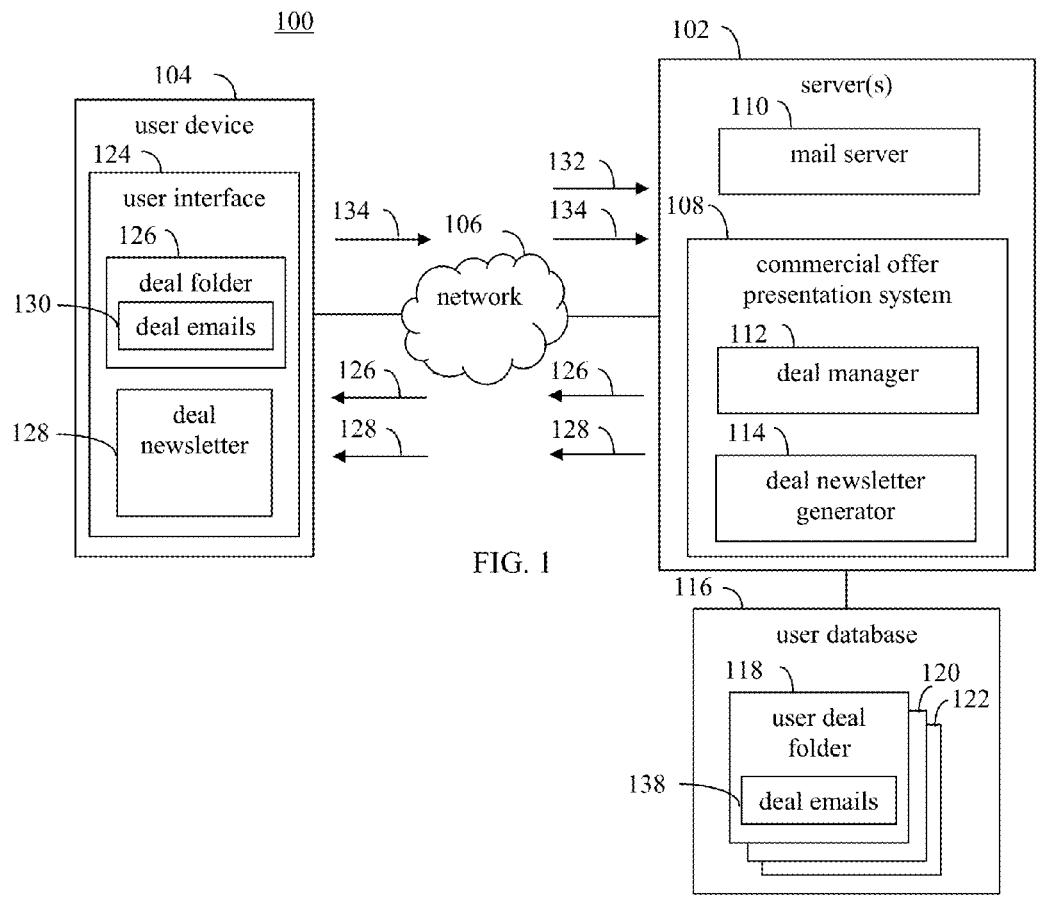
FIG. 1 shows a block diagram of a communication system in which commercial offer emails may be managed/organized for users, according to an example embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

II. Example Embodiments

A deal is an offer of a financial discount, rebate, coupon, or other incentive for purchasing a product and/or a service (or multiple products and/or services) that may be accepted by a customer. A commercial offer or commercial deal is an offer to one or more customers (users) from a merchant to purchase products and/or services through the merchant, and may include a commercial incentive (e.g., financial discounts, coupons, rebates, etc.) to encourage customers to purchase the products and/or services. A "deal site" is an example of such a merchant. A deal site is a website on the Internet that provides commercial offers for discounted products and services to groups of users. A deal site may provide commercial offers for discounted products and services provided/sold by other merchants as an intermediary.

Examples of such deal sites include www.groupon.com provided by Groupon, Inc. of Chicago, Ill. and livingsocial.com provided by LivingSocial Inc. of Washington, D.C. These deal sites typically mass email commercial offers to users. As a result, users receive large numbers of emails continuously from deal sites, which in some cases amounts to multiple emails received from a single deal site each day. The users spend time reviewing each of these received emails in the hopes that they may find a relevant deal, and their inboxes may become very full and cluttered with deal emails that the users may or may not be interested in.

Embodiments are described herein organizing commercial offer/deal emails sent by entities to users. In an embodiment, the deal emails received by a user are organized, such as being collected in an email deal folder. Furthermore, in an embodiment, the deal content of email deals received by a user may be extracted and structured to form a deal newsletter for the user. The deal newsletter may provide a "smart" summary of commercial offers received by the user, may provide additional information for those commercial offers, and may recommend similar or/or better deals for the user. Still further, by using recommendations and/or by ranking deals in the deal newsletter, offered deals may be better monetized by merchants and/or deal system managers (e.g., email providers, etc.) through greater acceptance of the offers by the users.

Embodiments may be implemented in a variety of environments. For instance, FIG. 1 shows a block diagram of a communication system 100 in which commercial offer emails may be organized for users, according to an example embodiment. Environment 100 is shown for purposes of illustration, and embodiments may be implemented in other environments, as would be apparent to persons skilled in the relevant art(s) from the teachings herein. As shown in FIG. 1, system 100 includes one or more servers 102, a user device 104, a network 106, and a user database 116. Furthermore, as shown in FIG. 1, server(s) 102 includes a commercial offer presentation system 108 and a mail server 110. System 100 is described as follows.

User device 104 may be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a smart phone (e.g., an Apple iPhone, a Google Android™ phone, a Microsoft Windows® phone, etc.), or other type of computing device. Although a single user device is shown in shown in FIG. 1, any number of user devices may be present, including tens, hundreds, thousands, and even greater numbers of user devices.

Server(s) 102 may be implemented in one or more computer systems, including one or more servers, which may be any type of computing device described herein or otherwise known that is capable of enabling the corresponding functionality described herein.

Server(s) 102 and user device 104 are communicatively coupled with each other through network 106. Network 106 may be a LAN (local area network), a WAN (wide area network), or any combination of networks, such as the Internet. Server(s) 102 and user device 104 are each coupled with network 106 through a respective communication link. The communication links may each include wired and/or wireless links. Examples of such communication links include IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB (universal serial bus) links, etc.

Network 106 may include one or more routers, hubs, switches, bridges, etc., used to connect devices/networks and/or to forward data (e.g., data packets). In embodiments, network 106 may include the Internet and/or an intranet. Network 106 may enable RF (radio frequency) or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

When signals are transmitted in signal packets in network 106, such signal packets may be compatible with or compliant with one or more protocols. Signaling formats or protocols employed may include, for example, TCP/IP, UDP, DECnet, NetBEUI, IPX, Appletalk, or the like. Example versions of the Internet Protocol (IP) may include IPv4 or IPv6.

Server(s) 102 includes one or more servers. At least one of the servers of server(s) 102 includes mail server 110, which is configured to manage mail accounts for users. For instance, as shown in FIG. 1, mail server 110 may receive emails 132, which may include any type of emails, including emails including commercial offers. Emails 132 may have any form, including Internet email message format (e.g., RFC 5322). Each email may include a header and a body, and may contain plain text, HTML (hypertext markup language), or other form of content. Mail server 110 may store emails 132 in accounts for users, and may enable the users to access the stored emails to read them. Mail server 110 may be operated by an email provider, such as Yahoo! Inc. of Sunnyvale, Calif., Google, Inc. of Mountain View, Calif., etc., or by other applicable entity. A user at a computing device, such as computing device 104, may have their email stored and served by mail server 110. The user may access a user interface at computing device 104, such as user interface 124, to access their email at mail server 110. For instance, user interface 124 may be a user interface that is accessible in a web browser or other application at computing device 104 for an email application or tool hosted by mail server 110 such as Yahoo!® Mail, Google Gmail™, etc.

Commercial offer presentation system 108 organizes commercial offer emails for users, and generates deal newsletters for users. For instance, as shown in FIG. 1, commercial offer presentation system 108 includes a deal manager 112 and a deal newsletter generator 114. In an embodiment, deal manager 112 may be configured to manage emails containing commercial offers directed one or more users. Deal manager 112 may determine which emails directed to a user contain commercial offers, and may organize those determined emails in any manner, such as by storing the determined emails in a deal folder for the user. Deal newsletter generator 114 may be configured to generate a deal newsletter for the user that at least summarizes the commercial offers contained in at least a portion of the emails stored in the deal folder for the user.

Figure 2:
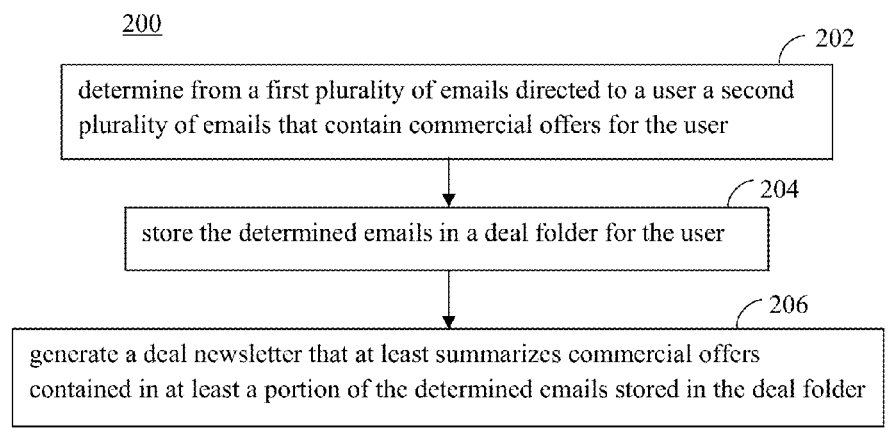
FIG. 2 shows a flowchart providing a process for organizing and presenting commercial offers for a user, according to an example embodiment.

For instance, FIG. 2 shows a flowchart 200 providing a process for organizing commercial offers for a user according to an example embodiment. In an embodiment, commercial offer presentation system 108 of FIG. 1 may operate according to flowchart 200. Further structural and operational embodiments will be apparent to persons skilled in the relevant art(s) based on the following description of flowchart 200.

Flowchart 200 begins with step 202. In step 202, a second plurality of emails is determined from a first plurality of emails directed to a user, the second plurality of emails containing commercial offers for the user. In an embodiment, deal manager 112 may be configured to determine emails that contain commercial offers for a user from emails that are received for the user from a variety of sources at mail server 110. For instance, deal manager 112 may analyze each email directed to the user that is received at mail server 110 for commercial offer content to determine whether the email contains a commercial offer. Deal manager 112 may use any suitable criteria to determine whether a received email contains a commercial offer.

For example, in an embodiment, deal manager 112 may store a list of email sender addresses, domain names, and/or other criteria that correspond to email senders that are entities known for emailing commercial offers. If an email is received from an address, domain name, etc., in the list, this may indicate that the email is likely to contain a commercial offer. Examples of such sender email addresses/domain names includes groupon.com (for Groupon, Inc.), livingsocial.com (for LivingSocial Inc.), google.com (for Google Offers™), etc. Additionally and/or alternatively, deal manager 112 may parse the subject line and/or body of the email for predetermined terms/words/characters that indicate that the email is likely to contain a commercial offer, such as the words "deal", "daily deal", "offer", "% off", "Groupon," "LivingSocial", etc. The presence of each term, word, or set of characters in an email indicates a corresponding likelihood of whether the email contains a commercial offer. The likelihoods for various words, terms, etc., which may be stored as pre-determined values, may be summed or otherwise accumulated by deal manager 112 for a particular email to determine an overall likelihood of whether the email contains a commercial offer. The overall likelihood determined for the email may be compared to a predetermined threshold value, or otherwise used, to determine whether the email contains a commercial offer. In other embodiments, deal manager 112 may use other techniques to determine whether a received email contains a commercial offer.

In step 204, the determined emails are stored in a deal folder for the user. In an embodiment, for each email determined to contain a commercial offer, deal manager 112 may store the determined mail in a deal folder corresponding to the user. For instance, as shown in FIG. 1, server(s) 102 may be communicatively coupled with user database 116. User database 116 may be used to track emails containing commercial offers for users. As shown in FIG. 2, deal manager 112 may organize commercial offer emails in user database 116 in deal folders for users, including user deal folders 118, 120, and 122, which correspond to first, second, and third users. Although three user deal folders are shown in FIG. 1, any number of user deal folders may be present, including, tens, hundreds, thousands, and even millions of user deal folders. Each user deal folder stores emails containing commercial offers for a corresponding user. For instance, user deal folder 118 stores deal emails 138 corresponding to a user of user device 104, which may include any number of deal emails.

The user may view their respective deal folder to view the commercial offer emails that the user has received. The deal folder in user database 116 may be transmitted from commercial offer presentation system 108 to a user device of the user to view in a user interface. For instance, as shown in FIG. 1, a user at user device 104 may view a deal folder 126 in user interface 124. Deal folder 126 includes deal emails 130 that were directed to the user.

In step 206, a deal newsletter is generated that at least summarizes commercial offers contained in at least a portion of the determined emails stored in the deal folder. As described above, in an embodiment, deal newsletter generator 114 may generate a deal newsletter for the user that at least summarizes commercial offers contained in at least a portion of the emails stored in the deal folder for the user. For instance, a deal newsletter generated for the user corresponding to user deal folder 118 may summarize the commercial offers contained in one or more of deal emails 138 stored in user deal folder 118.

For example, deal newsletter generator 114 may generate a deal newsletter 128 for the user to be displayed at user device 104 (e.g., in response to a request 134). As shown in FIG. 1, deal newsletter 128 is displayed in user interface 124. Deal newsletter 128 may be generated to at least summarize commercial offers contained in deal emails 130 directed to the user.

Deal newsletter 128 may contain one or more types of commercial offer-related content that summarizes commercial offers for the user. For instance, deal newsletter 128 may display portions of multiple commercial offers on a page, may indicate deal locations on a map, and may contain one or more filters that enable users to quickly explore the commercial offers. Deal newsletter 128 may display any number of commercial offers, such as commercial offers received in deal emails within a predetermined prior time period (e.g., the prior day, prior week, prior month, etc.). Deal newsletter generator 114 may generate deal newsletter 128 to show commercial offers from the received deal emails, as well as commercial offers received from one or more other sources (e.g., partner feeds, retrieved by a web crawler, etc.), in a common structure (e.g., using similarly arranged text, one or more similarly sized images, etc.). Deal newsletter 114 may enable the user to select and view an individual commercial offer email, with additional offer attributes and/or offer recommendations displayed on and/or alongside the commercial offer email. Still further, deal newsletter 128 may enable searching of deal emails in the user's deal folder, and the search results may be presented in the form of a deal.

Example embodiments for commercial offer presentation system 108, for generating deal folders, and for generating deal newsletters, as well as further embodiments are described in the following subsections.

A. Example Embodiments for Managing Deal Folders

As described above, in embodiments, commercial offer presentation system 108 may manage deal folders that contain commercial offers directed to users, and may generate deal newsletters that summarize the commercial offers. In this manner, users can view and evaluate the commercial offers that are emailed to them in a more unified, convenient, and time efficient manner, as opposed to having to separately open and review numerous separate emails.

Figure 3:
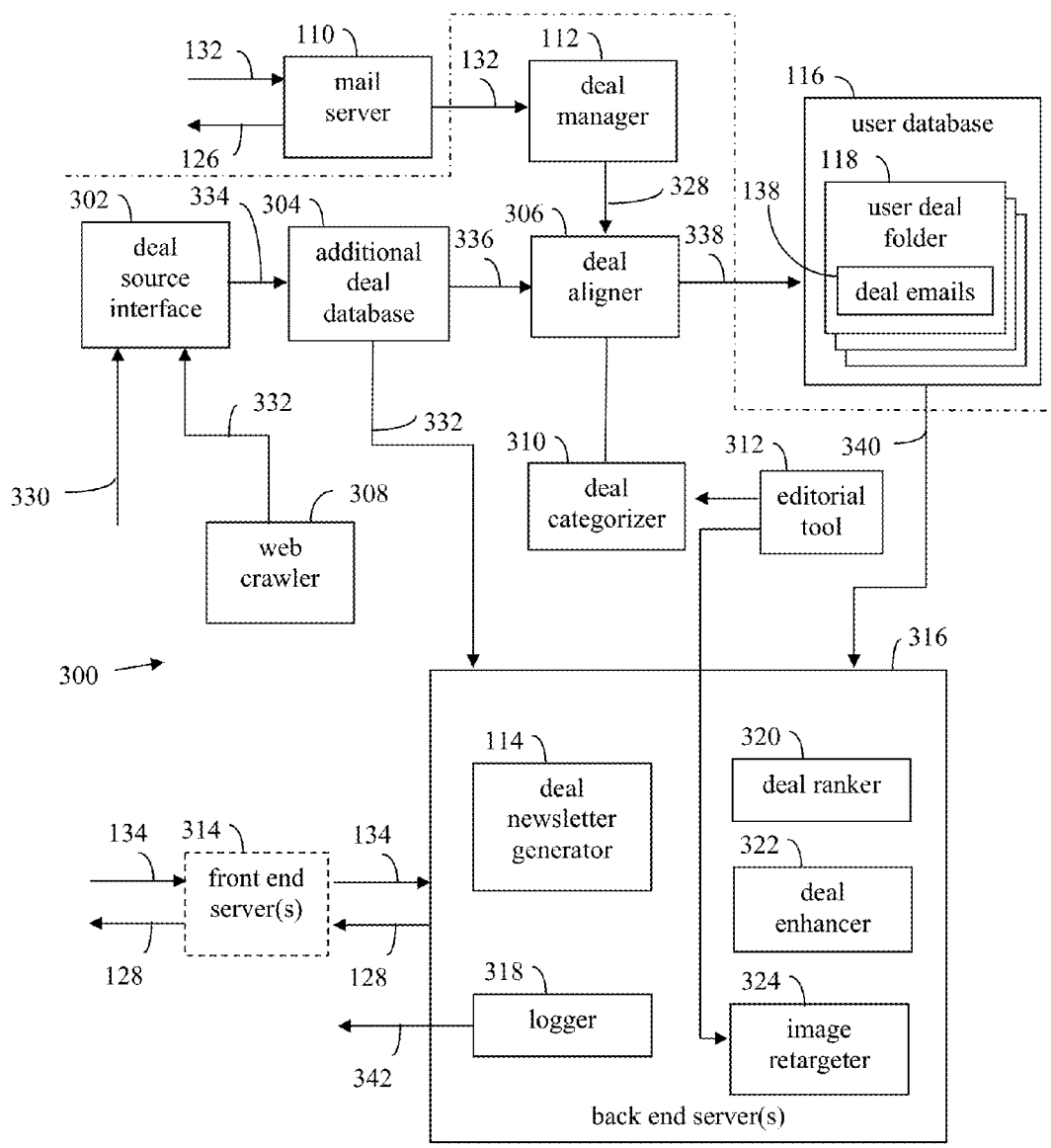
FIG. 3 shows a block diagram of a commercial offer presentation system, according to an example embodiment.

Commercial offer presentation system 108 may be configured in various ways, in embodiments. For instance, FIG. 3 shows a block diagram of mail server 110, user database 116, and a commercial offer presentation system 300 (shown below the dash-dot-dash line), according to an example embodiment. Commercial offer presentation system 300 is an example of commercial offer presentation system 108 of FIG. 1. As shown in FIG. 3, commercial offer presentation system 300 includes deal manager 112, deal newsletter generator 114, a deal source interface 302, an additional deal database 304, a deal aligner 306, a web crawler 308, a deal categorizer 310, an editorial tool 312, one or more front end servers 314, one or more back end servers 316, a logger 318, a deal ranker 320, a deal enhancer 322, and an image retargeter 324. Deal newsletter generator 114, logger 318, deal ranker 320, deal enhancer 322, and image retargeter 324 are shown included in back end server(s) 316 for purposes of illustrations, but in other embodiments may be distributed across one or more servers in other ways. These features of FIG. 3 are described as follows in this subsection and subsequent subsections.

As described above, mail server 110 manages mail accounts for users. For instance, as shown in FIG. 3, mail server 110 may receive emails 132 directed to one or more users. Mail server 110 may organize emails 132 in an email database stored in any form of storage described herein or otherwise known.

As shown in FIG. 3, deal manager 112 may receive emails 132 from mail server 110. As described above, deal manager 112 manages emails containing commercial offers directed one or more users. For instance, deal manager 112 may determine which emails of emails 132 contain commercial offers for users. In an embodiment, deal manager 112 may organize the determined emails in deal folders for users, such as user deal folders 118, 120, and 122 shown in FIG. 1 and maintained in user database 116. As shown in FIG. 3, deal manager 112 outputs deal emails 328, which indicates the emails of emails 132 that contain commercial offers for users. For instance, deal emails 328 may indicate each deal email by an identifier (e.g., an email identifier), may indicate the user to which each deal email is directed, may indicate a deal folder in which each deal email is to be stored, may contain each deal email, and/or may indicate further information. Deal emails 328 may be received by deal aligner 306 prior to being received by user database 116, as shown in FIG. 3, and/or deal emails 328 may be directly received in user database 116.

Figures 4, 5:
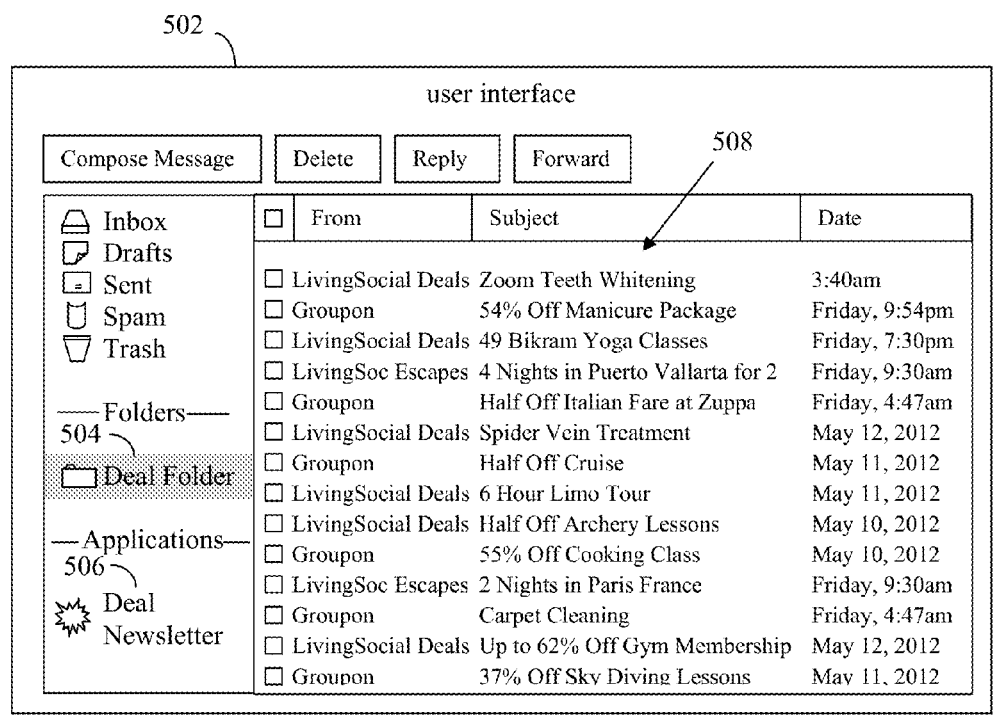
FIG. 4 shows a process for providing a deal folder to a user that organizes commercial offers, according to an example embodiment.
FIG. 5 shows a block diagram of a user interface for managing and accessing commercial offer emails, according to an example embodiment.

As described above, a user may display their deal folder to view the commercial offer emails that the user has received. For instance, FIG. 4 shows a step 402 for providing a deal folder to a user that organizes commercial offers, according to an example embodiment. In step 402, deal folder information is transmitted to a computing device of the user to enable display of the deal folder to the user at the computing device. For example, as shown in FIG. 3, mail server 110 may transmit information representative of deal folder 126 from commercial offer presentation system 300 to a user device 104. This deal folder information (e.g., copies of the emails stored therein, etc.) is transmitted to enable the deal folder to be displayed to the user at user device 104. Referring to FIG. 1, deal folder 126 may be transmitted in one or more communication signals from server(s) 102 through network 106 to be received by user device 104. At user device 104, deal folder 126 may be displayed in user interface 124 based on the transmitted deal folder information. Deal folder 126 includes deal emails 130 that were directed to the user.

User interface 124 may be configured in various ways to display deal folder 126, in embodiments. For instance, FIG. 5 shows a block diagram of a user interface 502 for managing and accessing commercial offer emails, according to an example embodiment. As shown in FIG. 5, user interface 502 is a window that displays a plurality of deal emails 508 in a list. For instance, in an embodiment, user interface 502 may be a graphical user interface (GUI) of a mail tool that displays a user's "Inbox", enables the user to draft emails, enables the user to view sent emails, enables the user to view spam email, and enables the user to view deleted emails in "Trash". Furthermore, user interface 502 may enable the user to compose emails, delete emails, reply to received emails, and forward emails.

Still further, user interface 502 may enable the user to view the user's deal emails by enabling the user to select a "deal folder" icon (deal folder 504) shown in user interface 502 (e.g., by mouse click, etc.), or by interacting with another user interface element in another manner. Referring to FIG. 1, when deal folder 504 is selected by the user, a request is transmitted from user device 104 through network 106 to server(s) 102 for the deal folder of the user. In response, mail server 110 may transmit deal folder 126, including the deal emails stored in the deal folder of the user, to user device 104 through network 106. As shown in FIG. 5, deal emails 508 stored in the deal folder of the user are displayed to the user in user interface 508. The user may interact with deal emails 508 in user interface 502 in any suitable manner to view particular deal emails, to delete deal emails, etc. For instance, each deal email may be displayed by displaying a source ("From"), a subject, a date, and/or other information for each deal email. Examples of user interface elements for user interface 502 include graphical buttons, text entry boxes, check boxes, pull down menus, etc. Any number and combination of user interface elements may be present.

Note that in embodiments, user interface 502 may be displayed in any form. For instance, in the example of FIG. 4, user interface 502 may be provided in a web page displayed by a browser. Example browsers include Internet Explorer®, developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome of Mountain View, Calif., etc. In other embodiments, user interface 502 may be provided by another type of application (e.g., a desktop application, a mobile "app", etc.), or may be provided in another manner.

B. Example Embodiments for Aligning Alternative Commercial Offers

As described above, commercial offers and/or related information may be received/obtained from one or more alternative sources than the deal emails directed to users. For instance, additional commercial offer information may be received from entities that have a business relationship with the provider of commercial offer presentation system 300 ("partner feeds") that desire to provide new commercial offers to the users and/or to enhance the commercial offers that the users have received in deal emails. Furthermore, additional commercial offer information may be proactively retrieved from one or more network sources, such as by a web crawler. In this manner, the commercial offers provided to users (e.g., in a deal newsletter) may be enhanced by providing additional commercial offers and/or by providing additional offer information with the commercial offers that were received in the deal emails.

As used herein, commercial offer information includes information that may be included in a commercial offer, such as an offer title, an offer category (e.g., a product or service category, such as "automotive," "insurance," etc.), an expire date for the offer, a deal source (e.g., an identification of a merchant making the commercial offer), a discount amount (e.g., a percentage discount, a price reduction amount, etc.), a price (e.g., a price a user may pay to participate in the commercial offer), one or more images (e.g., image files) associated with the commercial offer, etc. Commercial offer information may include a complete commercial offer, or may include less information than a complete commercial offer (e.g., may not include a price, etc.). As such, in some cases, commercial offer information may include information used to enhance or complete another commercial offer.

Referring back to FIG. 3, deal source interface 302 is configured to receive commercial offer information from one or more sources. For instance, as shown in FIG. 3, deal source interface 302 may receive a partner feed 330 from one or more entities. Partner feed 330 is a feed (e.g., a communication signal) that is generated by an entity to provide additional commercial offers and/or to provide enhancing information for existing commercial offers (received in deal emails). Partner feed 330 may be received from a remote server of the entity (e.g., a merchant) in any form, such as a web feed (e.g., an XML-based document), a RSS (really simple syndication) feed, or other type of feed. In an embodiment, partner feed 330 may have a pre-agreed upon data format so that commercial offers/commercial offer information may be present in partner feed 330 in a common structure and easy-to-process manner.

Furthermore, as shown in FIG. 3, deal source interface 302 may receive crawl results 332 from a web crawler 308. Web crawler 308 is a system (e.g., computer program) that browses the World Wide Web in a methodical manner ("crawling" or "spidering") to download/copy pages from the World Wide Web. In an embodiment, web crawler 308 may be configured to crawl one or more merchant websites to find and download commercial offers. For instance, web crawler 308 may be programmed to search one or more predetermined merchant websites (e.g., groupon.com, livingsocial.com, etc.). Web crawler 308 may additionally or alternatively be programmed to randomly search websites for deal information. Web crawler 308 may be programmed to recognize commercial offers in a similar manner as described above, such as by domain name, by finding terms in web pages such as "deal", "daily deal", "% off", etc. The downloaded commercial offers are output in crawl results 332 by web crawler 308.

Deal source interface 302 receives the commercial offers and/or commercial offer information from partner feed(s) 330 and/or commercial offers from crawl results 332, and stores the commercial offers/commercial offer information in additional deal database 304 in any suitable manner. For instance, each commercial offer/commercial offer information may be stored in additional deal database 304 in a commonly structured manner, such as including an offer title, category, expire date, deal source, discount amount, price, associated image(s), etc., when present.

In an embodiment, commercial offer presentation system 300 is configured to "align" commercial offers and commercial offer information received from the alternative sources with one or more commercial offers provided in deal emails for a user. The aligning refers to finding matches between commercial offers/commercial offer information received from the alternative sources with commercial offers provided in received deal emails. Matches may be found when comparisons are performed between offer categories, between portions of the offers/information, and exact and/or partial matches of textual description, image(s), or any other identifiable associated information for the deals are found, and/or when substantial similarities in content are found. When matches are found between commercial information received from the alternative sources and commercial offers provided in received deal emails, the commercial information received through the alternative sources may be provided to the user as annotations, or enhancements, to the commercial offers provided in received deal emails.

For instance, as shown in FIG. 3, deal aligner 306 receives deal emails 328. Deal emails 328 may be received from deal manager 112, as shown in FIG. 3, or may be accessed by deal aligner 306 in user database 116. Furthermore, as shown in FIG. 3, deal aligner 306 receives alternative offer information 336 from additional deal database 304. Alternative offer information 336 includes commercial offer information and/or commercial offers received from alternative sources, as described above. Deal aligner 306 may access alternative offer information 336 in additional deal database 304 when the above described aligning process is performed by deal aligner 306.

For example, partner feed 330 may provide commercial offer information from one or more entities (e.g., partners) that is related to commercial offers received in deal emails. The commercial offer information may include additional deal information for commercial offers received in deal emails (e.g., additional/different discounts for same or different products/services, etc.). Deal aligner 306 may receive the commercial offer information in alternative offer information 336. Alternative offer information 336 may include the commercial offer information in a predetermined, structured manner (e.g., identifying one or more fields/attributes of a title, source, product/service, price, discount, etc.). Deal aligner 306 may align the received commercial offer information of alternative offer information 336 with deal emails of deal emails 328 to determine which received deal emails the alternative offer information relates to. Deal aligner 306 may annotate a deal email of deal emails 328 with commercial offer information of alternative offer information 336 when a match is found (e.g., to fill an empty attribute/field, to add new information, etc.). Such annotation may be provided in any form, including plain text, HTML, etc.

For instance, a deal email of deal emails 328 may contain a commercial offer for a first cruise provided by a cruise line at a first discount amount. Deal aligner 306 may determine a match between the deal email and the commercial offer information, such as by matching titles, the source (e.g., same cruise line, same source domain name/email address), an identifier for the cruise, any associated images, etc. As a result, deal aligner 306 may annotate the deal email with the commercial offer information in any manner, such as by adding the commercial offer information to the deal email in its entirety, replacing an original commercial offer in the deal email with the commercial offer information, modifying the original commercial offer with the commercial offer information, and/or adding a pointer to matched commercial offer information, which can be used to update the deal information (e.g., bought number, etc.) constantly. For instance, in one example, deal aligner 306 may annotate the deal email with the commercial offer information so that when the deal email is displayed, the original commercial offer of the deal email is displayed. Deal aligner 306 may annotate the deal email with the commercial offer information so that when the deal email is displayed, the second discount amount, an updated expiration date, and/or other alternative deal information for the cruise is displayed in place of the first discount amount (alternatively, deal enhancer 322, as described further below, may perform this function). Furthermore, deal aligner 306 may annotate the deal email in further ways using the commercial offer information of alternative offer information 336.

In another example, partner feed 330 and/or crawl results 332 may include one or more commercial offers that is/are similar to commercial offers received in deal emails. Deal aligner 306 may receive the commercial offers in alternative offer information 336. Alternative offer information 336 may include the commercial offer(s) in a predetermined, structured manner (e.g., identifying one or more fields/attributes of a title, category, source, product/service, price, discount, etc., for each commercial offer). Deal aligner 306 may align the received commercial offer(s) of alternative offer information 336 with deal emails of deal emails 328 to determine a match (e.g., a same category, a similarity in offer content, etc.). Where a match between a commercial offer received in alternative offer information 336 and a deal email of deal emails 328 is found, it may be desirable to present the commercial offer received in alternative offer information 336 when the commercial offer of the deal email is displayed to the user. As such, deal aligner 306 may annotate a deal email of deal emails 328 with a commercial offer of alternative offer information 336 when a match is found.

Note that deal aligner 306 may be configured to align commercial offers/commercial offer information in any suitable manner, including by performing text matching (e.g., by matching similar titles, and/or other fields/attributes), image matching (e.g., by matching image features such as a substantially same color histogram, a color spatial distribution, etc.), statistical matching, etc. When commercial offers/commercial offer information is aligned that conforms to a predetermined structure (e.g., a deal taxonomy), the corresponding fields/attributes of the commercial offers/commercial offer information may be compared to determine matches. In some case, commercial offers/commercial offer information may be received that does not conform to the predetermined structure, and/or may be missing one or more fields/attributes of the predetermined structure. As shown in FIG. 3, deal categorizer 310 may be present (optionally). When present, deal categorizer 310 may be used to determine fields/attributes for commercial offers/commercial offer information that are missing and/or that do not match the predetermined structure (are improper).

For instance, in an embodiment, deal categorizer 310 may implement a support vector machine (SVM) or some other supervised learning techniques to recognize patterns, which may be used to determine missing/improper fields/attributes for commercial offers/commercial offer information. For instance, deal categorizer 310 may use tf-idf (term frequency-inverse document frequency) techniques to reflect how important a word is for a particular commercial offer or commercial offer information in a collection of commercial offers/commercial offer information. The more important words may be used to determine the values for missing/improper fields/attributes for commercial offers/commercial offer information. Once values for the fields/attributes are determined, deal aligner 306 may perform the aligning process for the commercial offers/commercial offer information.

Note that editorial tool 312 may optionally be present to enable a user to manually configure deal categorizer 310, as desired. For instance, the user may configure deal categorizer 310 to define fields/attributes, etc.

As shown in FIG. 3, deal aligner 338 outputs deal emails 338, which may include deal emails that are annotated with commercial offers and/or commercial offer information from additional deal database 304, and/or un-annotated deal emails.

C. Example Embodiments for Generating Deal Newsletters

As described above, a deal newsletter may be generated for a user that summarizes the deal emails that the user has received. In embodiments, the deal newsletter may indicate deal locations on a map, may contain filters that enable users to filter the display of commercial offers, may include commercial offers received from alternative sources, may include enhancements to commercial offers, may include offer recommendations, may include deal search capability, and/or may include further features. As such, the deal newsletter provides a convenient way for a user to view the commercial offers that the user has been receiving in email, as well as providing additional information.

As shown in FIG. 3, deal newsletter generator 114 of back end server(s) 316 generates a deal newsletter 128 for a user. In an embodiment, deal newsletter generator 114 generates deal newsletter 128 "on demand" by the user, although in other embodiments, deal newsletter generator 114 may generate deal newsletter 128 in an automatic fashion, such as on a periodic basis, or other basis, as desired for a particular situation.

Figure 6:
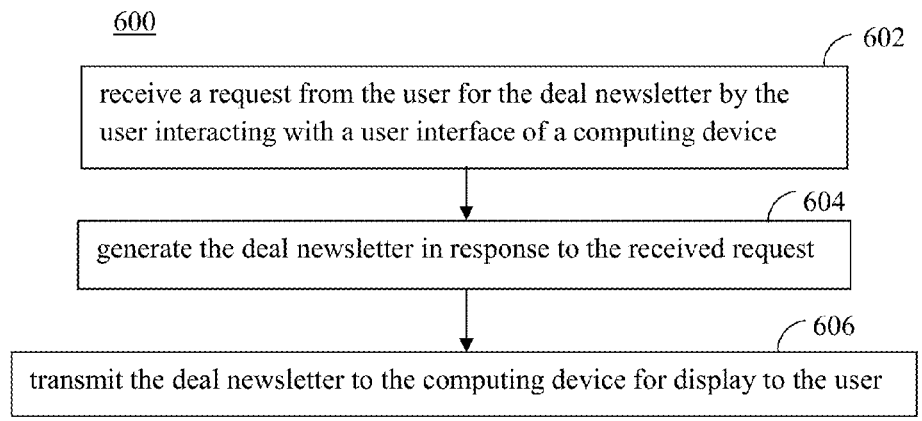
FIG. 6 shows a flowchart providing a process for generating a deal newsletter, according to an example embodiment.

For instance, FIG. 6 shows a flowchart 600 providing a process for generating a deal newsletter, according to an example embodiment, according to an example embodiment. In an embodiment, deal newsletter generator 114 may operate according to flowchart 600. Further structural and operational embodiments will be apparent to persons skilled in the relevant art(s) based on the following description of flowchart 600.

Flowchart 600 begins with step 602. In step 602, a request is received from the user for the deal newsletter by the user interacting with a user interface of a computing device. For example, referring to FIG. 1, a user at user device 104 may interact with user interface 124 to request a deal newsletter for the user. Referring to the example of FIG. 5, user interface 502 may enable the user to request a deal newsletter by enabling the user to select a "deal newsletter" icon (deal newsletter 506) shown in user interface 502 (e.g., by mouse click, etc.), or by interacting with another user interface element. When deal newsletter 506 is selected by the user, a request 134 is transmitted from user device 104 through network 106 to server(s) 102 for the deal newsletter. As shown in FIG. 3, deal newsletter 506 may be optionally received by deal newsletter generator 114 (in back end server(s) 316) through front end server(s) 314. Note that in an embodiment, deal folder 504 and deal newsletter 506 in FIG. 5 may be integrated so that it is not necessary for the user to switch back and forth between them. For instance, in an embodiment, one of deal folder 504 or deal newsletter 506 may be present in user interface 502 (the other one not present), and this single feature may be interacted with to enable deal emails 508 to be displayed and to cause a deal newsletter to be generated (e.g., deal newsletter 128) and displayed.

Figure 7:
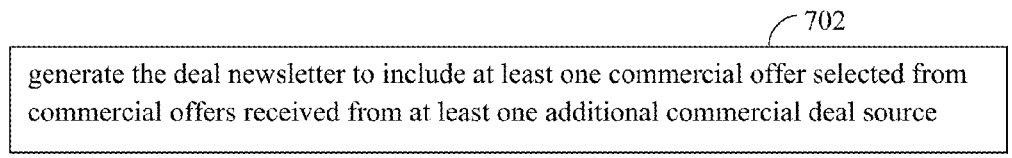
FIG. 7 shows a process for generating a deal newsletter that includes a commercial offer from a source other than email, according to an example embodiment.

In step 604, the deal newsletter is generated in response to the received request. In response to receiving request 134, deal newsletter generator 114 generates deal newsletter 128 for the user. As described above, deal newsletter 128 may include one or more pages that summarize commercial offers received in deal emails by the user. Furthermore, in an embodiment, deal newsletter 128 may include further commercial offers. For instance, in an embodiment, step 604 may include a step 702 shown in FIG. 7. In step 702, the deal newsletter is generated to include at least one commercial offer selected from commercial offers received from at least one additional commercial deal source. For example, deal newsletter 128 may be generated to include commercial offers received at deal source interface 302 (e.g., in partner feed 330, crawl results 332, etc.), and/or may be generated to include enhancements to commercial offers received in commercial offer information (e.g., in partner feed 330). Deal newsletter 128 may be generated in any form (e.g., one or more files or objects), and described in any suitable form, such as text, XML (extensible markup language), HTML (hypertext markup language, a programming language, a scripting language (e.g., JavaScript, VBScript, AppleScript, etc.), etc.

In step 606, the deal newsletter is transmitted to the computing device for display to the user. As shown in FIG. 1, server(s) 102 may transmit deal newsletter 128 to user device 104 through network 106. As shown in FIG. 3, deal newsletter 128 may be optionally transmitted by deal newsletter generator 114 (in back end server(s) 316) through front end server(s) 314. Deal newsletter 128 may be displayed to the user in user interface 124 (FIG. 1) in any manner. For instance, deal newsletter 128 may be displayed by a web browser or another type of application. User interface 124 may enable the user to page and/or scroll through deal newsletter 128 to view and/or interact with the commercial offers and other information displayed therein in any suitable manner.

Note that logger 318 may optionally be present to track transactions, including tracking which commercial offers are presented to users, which commercial offers users view, interact with, and participate in, etc. As shown in FIG. 3, logger 318 may output logged information 342, which may be stored in storage and/or used in any manner.

Figure 8:
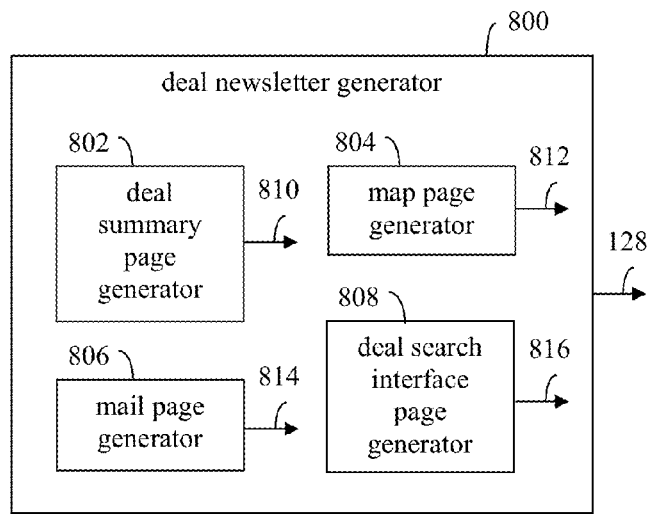
FIG. 8 shows a block diagram of a deal newsletter generator, according to an example embodiment.

Deal newsletter generator 114 may be configured in various ways to generate deal newsletter 128. For instance, FIG. 8 shows a block diagram of a deal newsletter generator 800, according to an example embodiment. Deal newsletter generator 800 is an example of deal newsletter generator 114. As shown in FIG. 8, deal newsletter generator 800 includes a deal summary page generator 802, a map page generator 804, a mail page generator 806, and a deal search interface page generator 808. Deal newsletter generator 800 may include any one or more of page generators 802, 804, 806, and 808, in embodiments. These features of deal newsletter generator 800 are described as follows.

Figure 9:
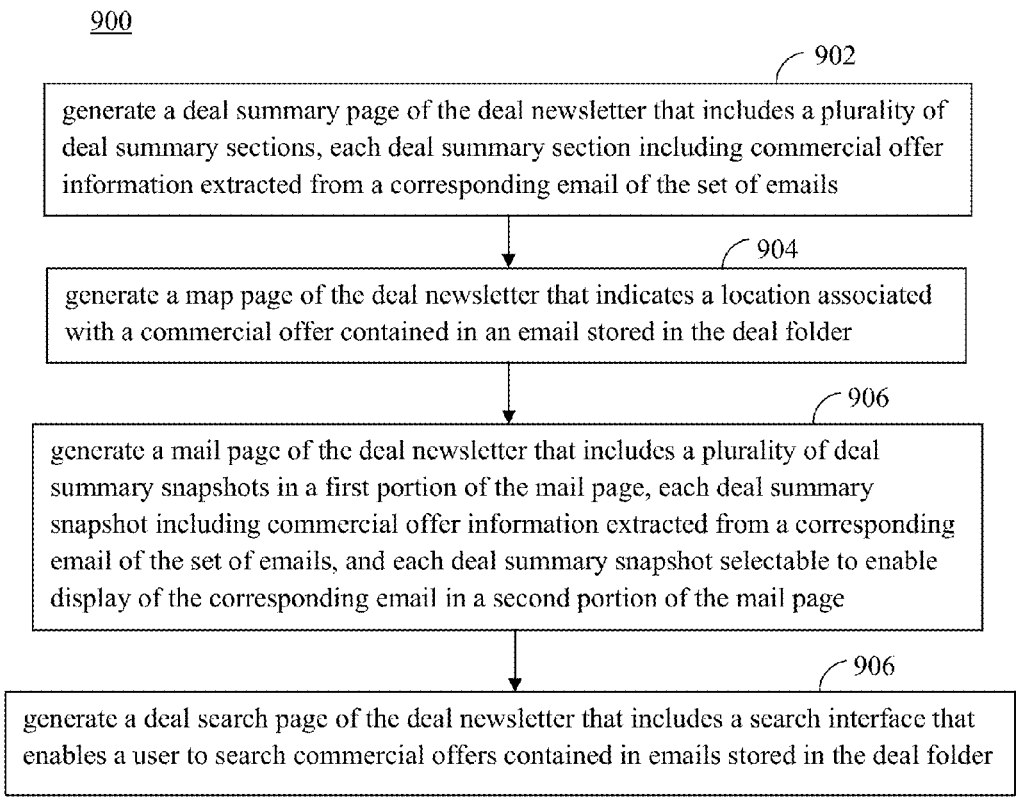
FIG. 9 shows a flowchart providing a process for generating pages of a deal newsletter, according to an example embodiment.

For instance, FIG. 9 shows a flowchart 900 providing a process for generating example pages of a deal newsletter, according to an example embodiment. In an embodiment, deal newsletter generator 800 may operate according to flowchart 900. Note that not all steps of flowchart 900 need to be performed in all embodiments, and the steps of flowchart 900 may be performed in any order. Further structural and operational embodiments will be apparent to persons skilled in the relevant art(s) based on the following description of flowchart 900 in the following subsections.

1. Example Embodiments for a Deal Summary Page

Flowchart 900 begins with step 902. In step 902, a deal summary page of the deal newsletter is generated that includes a plurality of deal summary sections, each deal summary section including commercial offer information extracted from a corresponding email of the set of emails. For instance, in an embodiment, deal summary page generator 802 of FIG. 8 may generate a deal summary page 810 of deal newsletter 128. Deal summary page 810 may summarize the deal emails stored in the deal folder of the user (e.g., deal folder 126 shown in FIG. 1), such as by displaying a portion of each deal email in a section of deal summary page 810.

Figure 10:
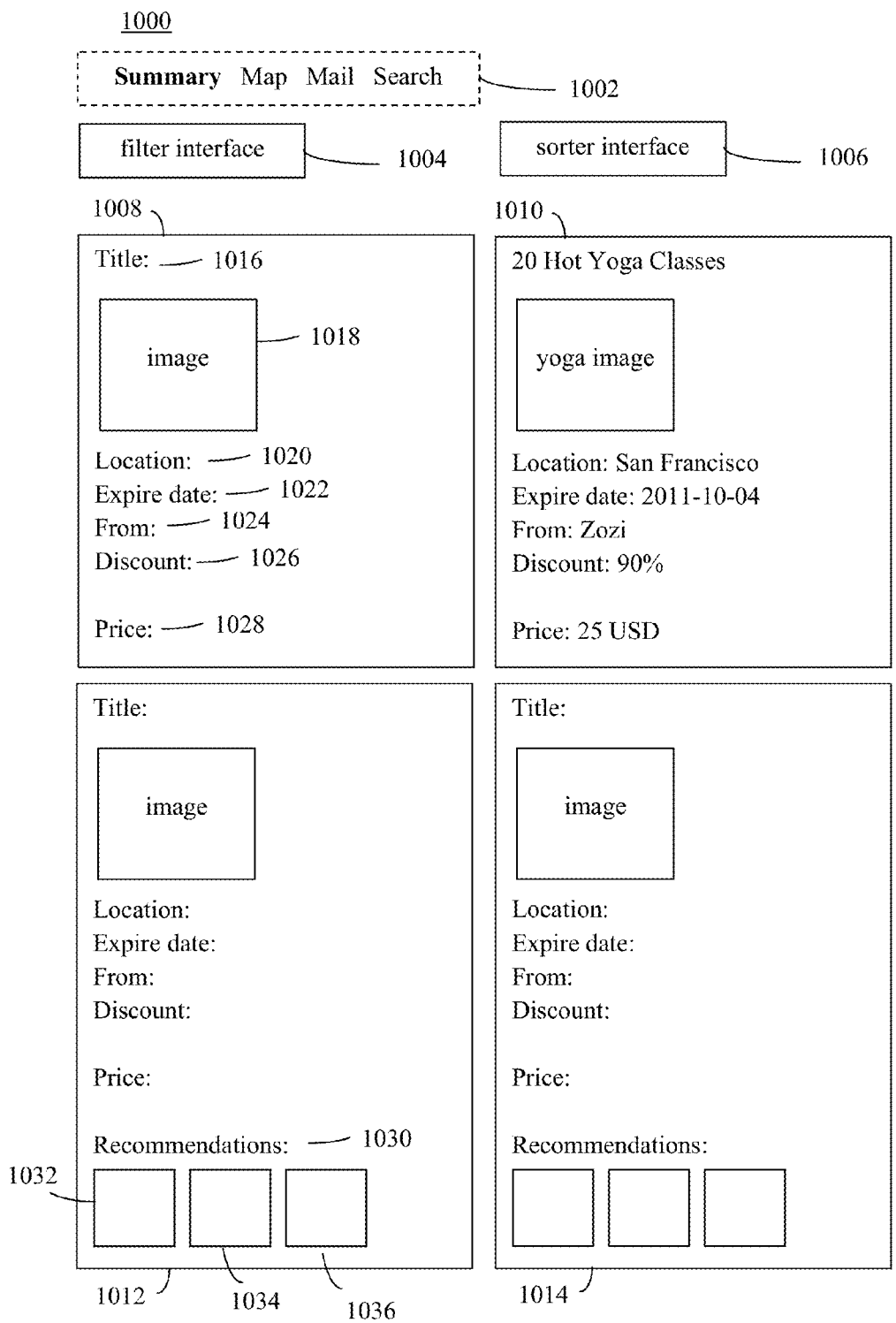
FIG. 10 shows a block diagram view of a deal summary page of a deal newsletter, according to an example embodiment.

Deal summary page 810 may be configured in various ways, in embodiments. For instance, FIG. 10 shows a block diagram view of a deal summary page 1000 of a deal newsletter, according to an example embodiment. Deal summary page 1000 is an example of deal summary page 810. Deal summary page generator 802 may generate deal summary page 1000 to summarize deal emails in the deal folder of the user.

For instance, in an embodiment, deal summary page 1000 may include a deal newsletter navigator section 1002. When present, deal newsletter navigator section 1002 may include one or more user interface elements that enable a user to navigate between pages of a deal newsletter. For example, as shown in FIG. 10, navigator section 1002 may include one or more page links, displayed as text, such as a "Summary" page link, a "Map" page link, a "Mail" page link, and a "Search" page link. By selecting one of the page links, a user may be navigated within the deal newsletter to the corresponding page. The page link for the page that is currently being displayed is shown in bold text in FIG. 10. In other embodiments, one or more alternative user interface elements may be present in deal newsletter navigator section 1002 to enable a user to navigate between pages of a deal newsletter, including one or more graphical buttons, a pull down menu, a pop up menu, etc.

Furthermore, as shown in FIG. 10, a plurality of deal summary sections 1008, 1010, 1012, and 1014 are displayed in deal summary page 1000. Each deal summary section displays a portion of a corresponding deal email in the user's deal folder. In the example of FIG. 10, four deal summary sections are displayed, but in other embodiments, any number of deal summary sections may be displayed. Such deal summary sections may be displayed in a two-by-two array, as shown in FIG. 10, or may be displayed in any other sized arrays, including in one or more columns and one or more rows. In an embodiment, a user may scroll up and down and/or left and right through deal summary page 1000 to be able view all deal summary sections.

As shown in the embodiment of FIG. 10, deal summary sections 1008, 1010, 1012, and 1014 may have a common format or structure, displaying the same fields/attributes in the same locations. Alternatively, one or more deal summary sections may be displayed in a different format or structure from other deal summary sections. Deal summary page generator 802 may extract values for each of the fields/attributes from the deal email containing the corresponding commercial offer. For instance, deal aligner 306, described above, may determine the values for the fields/attributes for each of deal emails 328, and may indicate the values in a structured manner in each deal email.

As indicated in deal summary section 1008, each deal summary section includes the display of the following fields/attributes: a title 1016, a location 1020, an expire date 1022, a from 1024, a discount 1026, and a price 1028, which are extracted by deal summary page generator 802 (FIG. 8) from the corresponding deal email or additional deal database 304. Furthermore, each deal summary section displays an image 1018. Example values for each field/attribute are shown in deal summary section 1010 for a commercial offer of yoga classes. Title 1016 indicates a title to be displayed for the deal summary section that is representative of the corresponding commercial offer (e.g., "20 Hot Yoga Classes"). Image 1018 is a representative image that is displayed for the commercial offer (e.g., a yoga image). Location 1020 indicates a location in which the commercial offer may be used (e.g., "San Francisco"). Expire date 1022 indicates an expiration date for the commercial offer (e.g., "2011-10-04"). From 1024 indicates a merchant that is providing the commercial offer (e.g., "Zozi"). Discount 1026 indicates an amount of the discount that is being provided by the commercial offer (e.g., "90%"). Price 1028 indicates the price of the offered product and/or service (e.g., "25 USD").

It is noted that not all of the fields/attributes shown in FIG. 10 need to be displayed in all embodiments, and in some embodiments, additional and/or alternative fields/attributes may be displayed.

In an embodiment, the image used as image 1018 may be extracted by deal summary page generator 802 from the deal email corresponding to the commercial offer. In an embodiment, image retargeter 324 of FIG. 3 may be accessed by deal newsletter generator 114 to resize an extracted image into a common/standard image size for images displayed in deal summary sections of deal summary page 1000. For instance, in an embodiment, image retargeter 324 may crop and/or scale/resize the image extracted from the deal email into the standard image size. When cropping an image, image retargeter 324 may use context-aware (maximizing remaining saliency) image cropping to convert the image into a uniform aspect ratio image to enable uniform presentation of images. Such techniques may be used to determine an important portion of an image (e.g., focusing on a person's head, an important object, etc.), which is retained, while other less portions of the image may be cropped and discarded, as would be known to persons skilled in the relevant art(s).

Note that editorial tool 312 may optionally be present to enable a user to configure image retargeter 324, as desired, and/or to manually resize an image for use in a deal summary section or deal summary snapshot. For instance, the user may user editorial tool 312 to interact with image retargeter 324 to crop an image, scale an image, etc.

Furthermore, in an embodiment, deal summary page generator 802 may access deal ranker 320 to rank commercial offers displayed in deal summary sections in deal summary page 1000. Such ranking may be used to determine commercial offers that are more relevant (higher ranked) to the user to display more prominently in deal summary page 1000 (e.g., displayed at the top of deal summary page 1000, etc.), while less relevant (lower ranked) commercial offers may be displayed less prominently (e.g., displayed at the bottom of deal summary page 1000, etc.). Commercial offers may be ranked on various factors, including an inferred deal quality, business logic, predefined user preferences, user location, etc., using various techniques to balance user experience and monetization capability, as would be known to persons skilled in the relevant art(s). Furthermore, deal ranker 320 may be configured to find and rank additional commercial offers received at deal source interface 320, such as partner feed 330, as recommendations for the user. These recommendations may be generated at a user level or category level, and may be positioned before or in deal newsletter 128. Alternatively, these recommendations maybe be generated according the deal received by the user, and placed or showed along with an original deal offer. The matching and/or ranking may be performed according to a similarity to the original deal, such as by matching one or more of location, title, or category. In another embodiment, the matching and/or ranking can be performed according to user's profile, matching profile attributes such as location, past history of interacting with deals (e.g., such as clicking on deals, buying services/items of deals, etc.).

Still further, as shown in FIG. 10, deal summary page 1000 may include a filter interface 1004 and/or a sorter interface 1006. A user may interact with filter interface 1004 to cause deal summary page generator 802 to filter the deal summary sections that are displayed in deal summary page 1000. For instance, filter interface 1004 may include one or more user interface elements (e.g., buttons, menus, links, etc.) that may be interacted with to filter displayed deal summary sections by fields/attributes, such as by category, by price, by discount, etc. Deal summary sections that do not fit the filter criteria set by filter interface 1004 may be filtered out (e.g., not displayed in deal summary page 1000). Furthermore, the user may interact with sorter interface 1006 to cause deal summary page generator 802 to sort the deal summary sections that are displayed in deal summary page 1000. For instance, sorter interface 1006 may include one or more user interface elements (e.g., buttons, menus, links, etc.) that may be interacted with to sort displayed deal summary sections by fields/attributes, such as by category, by price, by discount, etc. The deal summary sections may be sorted in ascending order, descending order, and/or in other ways, according to the particular field/attribute sort criteria set in sorter interface 1006.

As described above, deal summary page generator 802 may display commercial offers received in deal emails by the user in deal summary page 1000. Furthermore, deal summary page generator 802 may generate deal summary page 1000 to display commercial offers received from alternative sources as recommended offers. For instance, deal summary page generator 802 may access user database 116 for commercial offers received from alternative sources that deal aligner 306 indicated as matches for commercial offers received in deal emails by the user.

Deal summary page generator 802 may display the recommended offers in deal summary page 1000 in any manner. For instance, in FIG. 10, deal summary sections 1008 and 1010 may display recommended offers, while deal summary sections 1012 and 1014 may display commercial offers received in deal emails by the user. Any number and arrangement of deal summary sections in deal summary page 1000 may display recommended offers. Furthermore, as shown in FIG. 10, recommended offers that were determined to match commercial offers received in deal emails may be displayed within a deal summary section of the matching commercial offer. For instance, as shown in FIG. 10, recommended offers 1032, 1034, and 1036 are shown displayed in a recommendations section 1030 of display summary section 1012. Recommended offers 1032, 1034, and 1036 were determined by deal aligner 306 to be closely related enough to the commercial offer of the deal email corresponding to deal summary section 1008 to be displayed therein as recommended offers.

Recommended offers 1032, 1034, and 1036 may each be displayed in any manner in a deal summary section, such as being shown as a "snapshot" that includes an image (cropped/resized) from the corresponding commercial offer, and/or text from the corresponding commercial offer that summarizes the corresponding commercial offer. Furthermore, any number of one or more recommended offers may be displayed in a deal summary section in this manner. Such deal summary snapshots are generally smaller in size than deal summary sections, containing the snapshot image, but generally containing less text than a deal summary section (e.g., just a title, or portion thereof, etc.). In an embodiment, such deal summary snapshots resemble "thumbnail" images.

As such, in an embodiment, a user that views deal summary page 1000 can view each deal summary section to receive a summary of the corresponding commercial offer email, and may interact with a deal summary section (e.g., may click on it, etc.) to be displayed further information regarding the commercial offer. For instance, in embodiments, by interacting with a deal summary section, the deal email may be displayed, the corresponding merchant's website may be navigated to so that the user can accept the commercial offer, and/or other events may be triggered. Still further, offer recommendations may be displayed.

2. Example Embodiments for a Map Page

Referring back to FIG. 9, in step 904, a map page of the deal newsletter is generated that indicates a location associated with a commercial offer contained in an email stored in the deal folder. For instance, in an embodiment, map page generator 804 of FIG. 8 may generate a map page 812 of deal newsletter 128. Map page 812 may display a map that indicates locations associated one or more commercial offers contained in deal emails stored in the deal folder of the user (e.g., deal folder 126 shown in FIG. 1).

Figure 11:
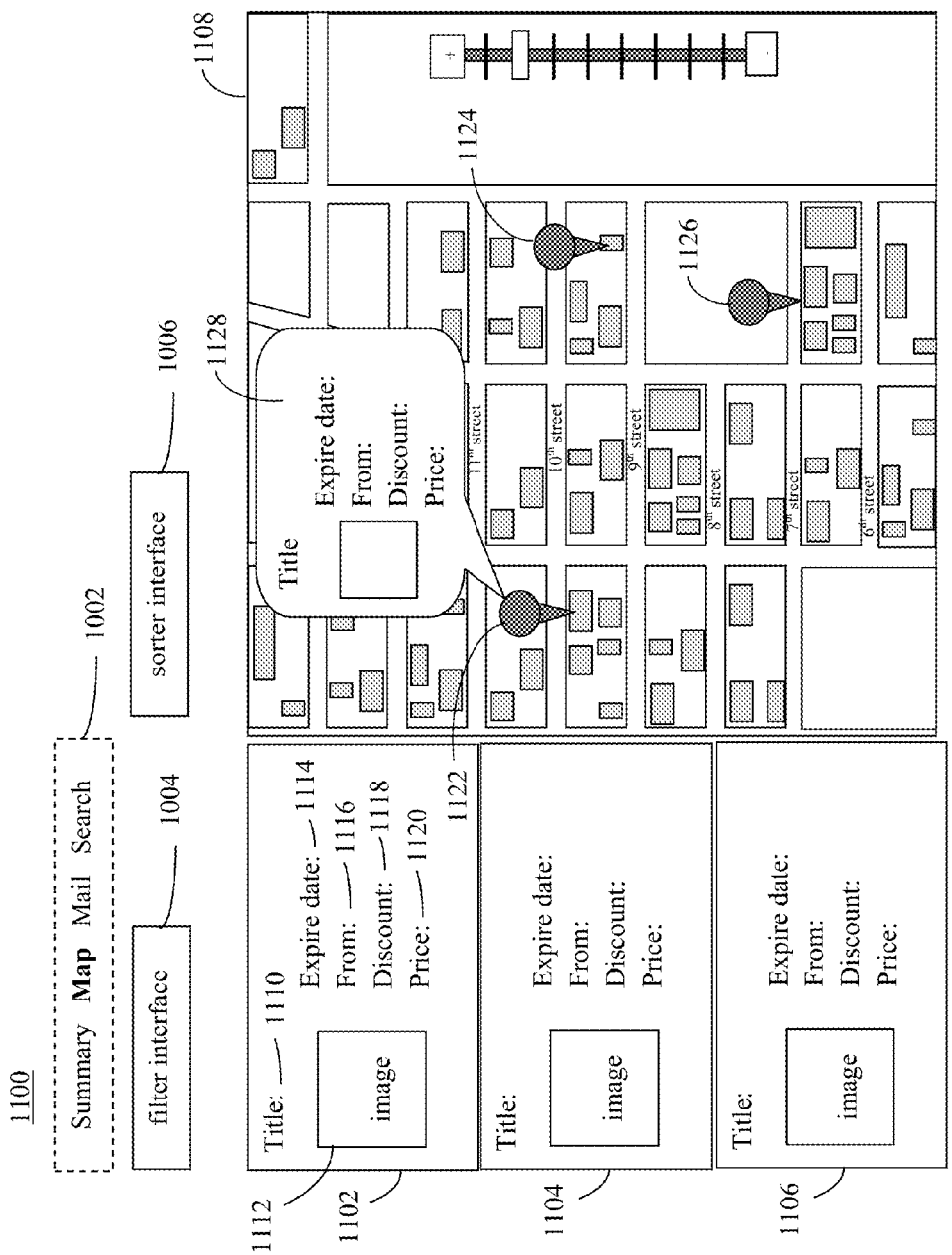
FIG. 11 shows a block diagram view of a deal map page of a deal newsletter, according to an example embodiment.

Map page 812 may be configured in various ways, in embodiments. For instance, FIG. 11 shows a block diagram view of a map page 1100 of a deal newsletter, according to an example embodiment. Map page 1100 is an example of map page 812. Map page generator 804 may generate map page 1100 to display locations associated with deal emails in the deal folder of the user.

For instance, in an embodiment, map page 1100 may include deal newsletter navigator section 1002, and may include one or both of filter interface 1004 and sorter interface 1006 to perform their respective functions with respect to deals represented in map page 1100.

Furthermore, as shown in FIG. 11, map page 1100 includes a first deal summary section 1102, a second deal summary section 1104, a third deal summary section 1106, and a map 1108. Deal summary sections 1102, 1104, and 1106 are generally similar to the deal summary sections described above, each summarizing a respective commercial offer of a deal email in a user's deal folder, or may summarize a recommended offer. For instance, deal summary section 1102 includes the following fields/attributes (described above): a title 1110, an expire date 1114, a from 1116, a discount 1118, and a price 1120. Furthermore, an image 1112 is displayed in deal summary section 1102. Any number of deal summary sections may be displayed in map page 1100.

Map 1108 includes a map of a region containing locations associated with the displayed deal summary sections. For instance, as shown in FIG. 11, map 1108 includes a first location 1122, a second location 1124, and a third location 1126 (indicated by respective pins or indicators in the map) that correspond to deal summary sections 1102, 1104, and 1106. Locations 1122, 1124, and 1126 are locations of the businesses associated with the commercial offers of deal summary sections 1102, 1104, and 1106, such as a store location where a commercial offer (e.g., a discount, a coupon, etc.) may be redeemed (e.g., a location where a service may be performed, such as a location of a yoga studio, or where a product may be purchased/retrieved).

As shown in FIG. 11, a user may interact with one of locations 1122, 1124, and 1126 to be displayed additional information regarding the corresponding commercial offer. For instance, in an embodiment, if a user clicks on or hovers a mouse pointer over a location, such as location 1122, a pop-up caption 1128 may be displayed that displays fields/attributes/images for the corresponding commercial offer.

A user that views map page 1100 can view each deal summary section to receive a summary of the corresponding commercial offer email, and may interact with a deal summary section (e.g., may click on it, etc.) to be displayed further information regarding the commercial offer. Furthermore, the user may interact with a caption displayed for a location in map 1108 to be displayed further information regarding the commercial offer. For instance, in embodiments, by interacting with a deal summary section or caption, the deal email may be displayed, the corresponding merchant's website may be navigated to so that the user can accept the commercial offer, and/or other events may be triggered.

Map page generator 804 may generate map 1108 using a proprietary or commercially available mapping tool, including a network-based web service or application such as Yahoo!® Maps, MapQuest, and Google™ Maps.

3. Example Embodiments for a Mail Page

Referring back to FIG. 9, in step 906, a mail page of the deal newsletter is generated that includes a plurality of deal summary snapshots in a first portion of the mail page, each deal summary snapshot including commercial offer information extracted from a corresponding email of the set of emails, and each deal summary snapshot selectable to enable display of the corresponding email in a second portion of the mail page. For instance, in an embodiment, mail page generator 806 of FIG. 8 may generate a mail page 814 of deal newsletter 128 for a user. Mail page 814 may display a selected deal email from a deal folder of the user. Furthermore, mail page 814 may display a deal folder navigator to enable the user to concisely view deal emails in the deal folder, and to select a deal email in the deal folder for display in mail page 814.

Figure 12:
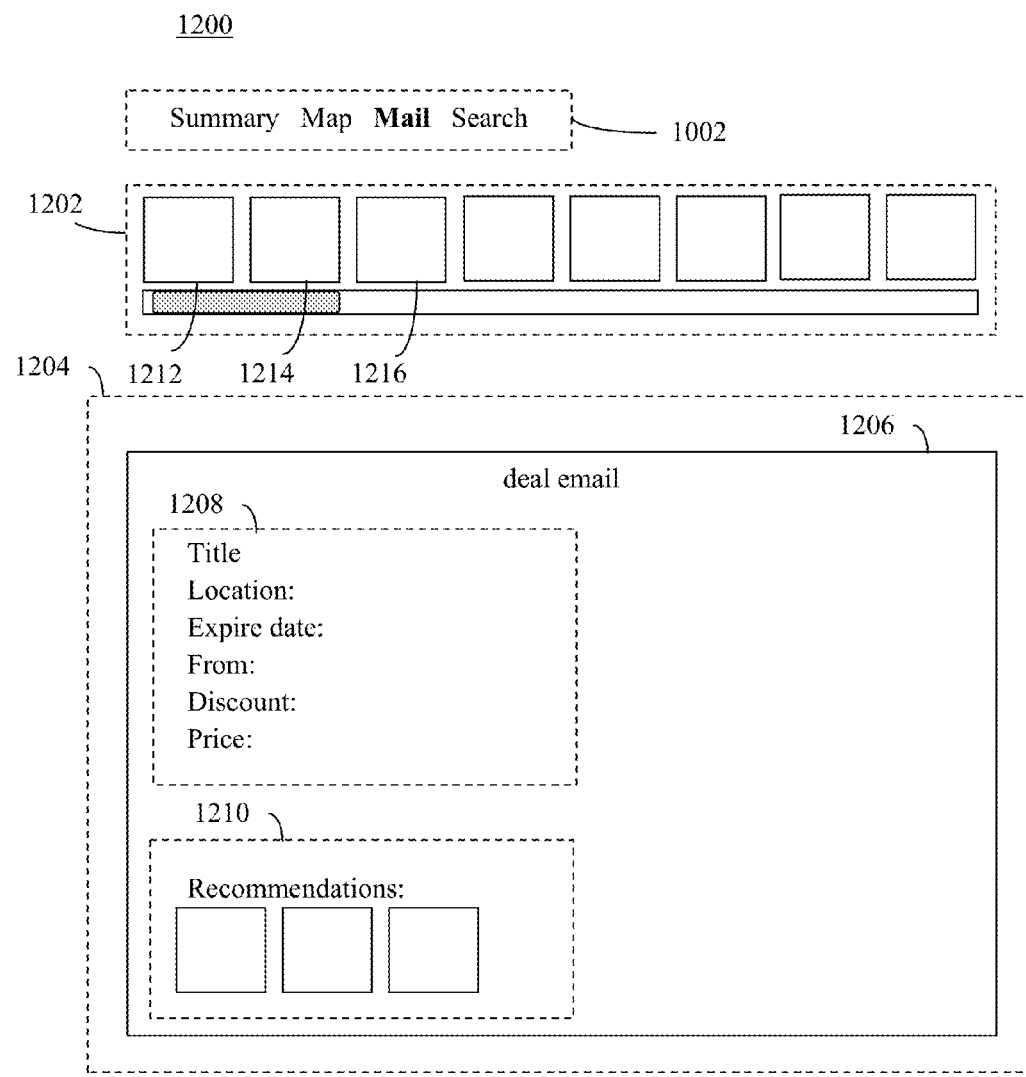
FIG. 12 shows a block diagram view of a deal mail page of a deal newsletter, according to an example embodiment.

Mail page 814 may be configured in various ways, in embodiments. For instance, FIG. 12 shows a block diagram view of a mail page 1200 of a deal newsletter, according to an example embodiment. Mail page 1200 is an example of mail page 814. Mail page generator 806 may generate mail page 1200 to display deal emails in the deal folder of the user.

For instance, in an embodiment, mail page 1200 may include deal newsletter navigator section 1002. Furthermore, as shown in FIG. 12, mail page 1200 may include a deal folder navigator 1202 in a first portion of mail page 1200 and an email display region 1204 in a second portion of mail page 1200.

Deal folder navigator 1202 is configured to enable a user to concisely view the deal emails contained in the user's deal folder. For instance, as shown in FIG. 12, deal folder navigator 1202 may include a plurality of deal summary snapshots 1212, 1214, and 1216 (and further deal summary snapshots), which correspond to three deal emails in a deal folder. Each deal summary snapshot includes an image (cropped/resized) from the corresponding commercial offer, and/or text from the corresponding commercial offer that summarizes the corresponding commercial offer. Any number of deal summary snapshots may be displayed in deal folder navigator 1202 at any time. Deal folder navigator 1202 may optionally include a slider/scroll bar or other user interface element to enable the user to display further deal summary snapshots of the deal folder that are not currently displayed on the screen due to screen space constraints.

In the example of FIG. 12, the deal summary snapshots are displayed in a horizontal row, but in other embodiments, may be displayed in further horizontal and/or vertical rows, or may be displayed in other ways.

In an embodiment, a user may interact with (e.g., click on, etc.) a deal summary snapshot in deal folder navigator 1202 to cause the corresponding deal email (the deal email on which the deal summary snapshot is based) to be displayed in email display region 1204. For example, as shown in FIG. 12, a user may have selected deal summary snapshot 1212 in deal folder navigator 1202 to cause a deal email 1206 corresponding to deal summary snapshot 1212 to be displayed in email display region 1204. In the example of FIG. 12, email display region 1204 is displayed below deal folder navigator 1202 in page 1200, but in other embodiments, may displayed elsewhere in page 1200 relative to deal folder navigator 1202 (e.g., above, to the right, to the left, etc.).

In an embodiment, enhancement information may be retrieved and displayed on deal email 1206 in page 1200. For instance, as shown in FIG. 12, enhancement information 1208 may be displayed on deal email 1206. Enhancement information 1208 includes enhancement information for the commercial offer corresponding to deal email 1206 that is determined by deal enhancer 322 (FIG. 3). Such enhancing may be used to add and/or modify commercial offer information contained in deal email 1206. The enhancement information may have been received at deal source interface 302 from an alternative source, such as partner feed 330, and may have been annotated on deal email 1206 by deal aligner 306 as described above, or may have been stored in user database 116. In an embodiment, deal enhancer 322 may retrieve and provide the enhancement information to be displayed in page 1200 over deal email 1206.

For instance, deal email 1206 may provide a commercial offer for a cruise line. Enhancement information 1208 may be displayed on deal email 1206 to provide additional and/or alternative information for the cruise line commercial offer. For example, enhancement information 1208 may include an offer title, a location, an expiration date, an indication of a merchant providing the commercial offer ("from"), a discount, a price, and/or other offer-related information.

Furthermore, in an embodiment, one or more deal recommendations may be retrieved and displayed on deal email 1206 in page 1200. For instance, as shown in FIG. 12, a recommendations section that includes a plurality of recommended deals may be displayed on 1206. The recommended deals may have been determined by deal ranker 320 (FIG. 3)

for deal email 1206, and/or may be retrieved from user database 116 by deal enhancer 322 to be displayed in page 1200 over deal email 1206.

It is noted that any amount of enhancement information and/or number of recommended deals may be displayed on deal email 1206 in any location. Alternatively, the enhancement information and/or one or more recommended deals may be displayed in page 1200 alongside deal email 1206.

4. Example Embodiments for a Deal Summary Page

Referring back to FIG. 9, in step 908, a deal search page of the deal newsletter is generated that includes a search interface that enables a user to search commercial offers contained in emails stored in the deal folder. For instance, in an embodiment, deal search interface page generator 808 of FIG. 8 may generate a deal search page 816 of deal newsletter 128 for a user. Deal search page 816 may display a search interface that enables a user to search a deal folder of the user. Furthermore, deal search page 816 may display further features, including deal summary sections and/or snapshots, links to other deals, a map indicating locations of deal search results, etc.

Figure 13:
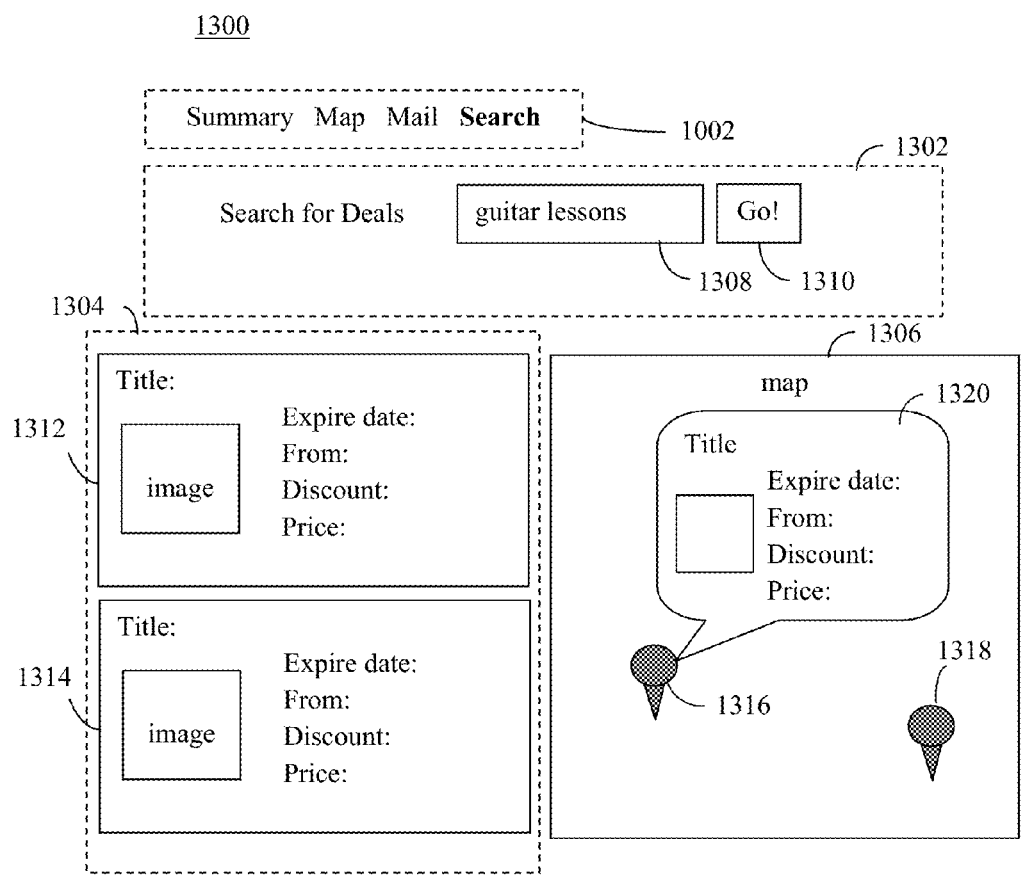
FIG. 13 shows a block diagram view of a deal search page of a deal newsletter, according to an example embodiment.

Deal search page 816 may be configured in various ways, in embodiments. For instance, FIG. 13 shows a block diagram view of a deal search page 1300 of a deal newsletter, according to an example embodiment. Deal search page 1300 is an example of deal search page 816. Deal search interface page generator 808 may generate deal search page 1300 to display a deal search interface 1302. Deal search interface 1302 is a user interface that may be interacted with by a user to search the deal emails in the deal folder of the user. Deal search interface 1302 may include one or more user interface elements suitable for performing a search, such as a search entry box 1308 and a search execute button 1310 shown in FIG. 13. A user may enter (e.g., by typing, by voice transcription, etc.) one or more search keywords/terms into search entry box 1308 to define a search, and may interact with (e.g., click on) button 1310 to execute the search. The search keywords may be provided to a search engine included in deal search interface page generator 808 of FIG. 8, or external to deal search interface page generator 808, to perform a search of the deal folder of the user on the search keywords. The search may be performed in any manner, including using a simple text search (e.g., determining words in one or more deal emails that match the search keywords) or by a more complex type of searches. One or more deal emails in the deal folder that contain the search keywords, or that match search criteria in any other way, may be returned as search results.

For instance, in an embodiment, deal search page 1300 may include deal newsletter navigator section 1002. Furthermore, deal search page 1300 may include a search results section 1304. Search results section 1304 includes one or more deal summary sections, such as deal summary sections 1312 and 1314. Deal summary sections 1312 and 1314 are each generally similar to the deal summary sections described above, summarizing a respective commercial offer in a deal email of the user's deal folder that appeared in the search results. For instance, as shown in FIG. 13, deal summary sections 1312 and 1314 each include the following fields/attributes (described above): title, expire date, from, discount, and price. Furthermore, an image is displayed in each of deal summary sections 1312 and 1314. Any number of deal summary sections may be displayed in search results section 1304.

As described above, a deal search page may include further features. For instance, as shown in FIG. 13, deal search page 1300 may include a map 1306. Map 1306 is generally similar to map 1108 (FIG. 11) described above, and includes a map of a region containing locations associated with the displayed deal search results. For instance, as shown in FIG. 13, map 1306 includes a first location 1316 corresponding to deal summary section 1312, and a second location 1318 corresponding to deal summary section 1314 (indicated by respective indicators in the map). Locations 1316 and 1318 are locations of the businesses associated with the commercial offers of deal summary sections 1312 and 1314.

As shown in FIG. 13, a user may interact with one of locations 1316 and 1318 to be displayed additional information regarding the corresponding commercial offer. For instance, in an embodiment, if a user clicks on or hovers a mouse pointer over a location, such as location 1316, a caption 1320 may be displayed that displays fields/attributes/images for the corresponding commercial offer.

A user that views deal search page 1300 can view each deal summary section to receive a summary of the corresponding commercial offer email, and may interact with a deal summary section (e.g., may click on it, etc.) to be displayed further information regarding the commercial offer. Furthermore, the user may interact with a caption displayed for a location in map 1306 to be displayed further information regarding the commercial offer. Still further, the user may enter different search keywords in search entry box 1308 to perform further searches on the deal emails in the user's deal folder.

D. Further Example Embodiments and Advantages

Accordingly, in embodiments, organizing deal emails in a deal folder for a user, and generating a custom deal newsletter for the user based on the deal emails, provides advantages. Among other things, commercial intent traffic in an email service is enabled to be monetized, and the experience of users is improved by generating customized commercial deal newsletters.

From the user perspective, a deal folder is generated as a type of smart folder. When deal email is received by the user, the deal email is routed into the special deal folder. When the folder is selected by the user, the user is provided with a list of deals over a given time period, along one or more optional recommendations for similar deals. The deal folder and deal newsletter may be configured to just include unread deal emails (e.g., filtering out deal emails previously displayed to the user or expired). The deal newsletter may be generated to contain additional and/or updated attributes for deals, such as deal locations, a map-based presentation of deals, etc., and may contain one or more types of filters to help users to quickly explore the deals. When the user views a deal email in the deal newsletter, additional deal attributes and/or deal recommendations can be displayed overlaid on the deal email. Furthermore, search results within the deal folder may be presented in form of deal.

From the deal server perspective, emails incoming to the user are scanned, and email attributes such as the email sender address may be used to identify deal emails. Structured information may be extracted from the deal emails in any manner, such as using the xpath (XML path language) rule to extract structured deal information from HTML formatted emails or regular expression for plain-text emails.

The extracted deal information may be aligned using rules such as title match and image retrieval to identify corresponding deals from partner feeds and/or other remote deal sources. The deal mail may be aligned with structured web crawling results, such as by the landing URL (uniform resource locator). For missing attributes, such as the category attribute, techniques such as SVM with tf-idf may be used to determine the missing attributes.

When a user requests the deal newsletter, structured information from the deals in the deal emails of the user may be retrieved (for a predetermined prior time period), and a rule-based aggregation technique may be used to unify the structured information from the deal emails, partner feeds, web crawling results, and/or other deal sources. The deals may optionally be ranked based on inferred deal quality, business logic, user preferences and/or other techniques to ensure a balance between user experience and monetization capability.

Compared to other email traffic monetization techniques, such as graphic advertisements or keyword based text advertisements, embodiments provide advantages in that traffic can be captured with real commercial intent. The correct product may be promoted under the proper context, because when a user visits a deal summary page, he/she has the intention to explore deals. With observed behaviors of the user, detailed intention or preferences may be inferred and served as important signals for more accurate targeting.

Furthermore, by automatically organizing commercial mails, the user experience is improved by reducing unnecessary interference from the deal emails. An email service provider may find a better way to monetize the traffic using embodiments, and users may also be benefited. The deal provider may obtain a larger audience if it becomes a partner of the email service provider. This provides a win-win-win solution for the deal email consumer, the email service provider, and also the deal provider.

Conventional email managing tools can aid users in organizing deal newsletter into folders, or adding labels. However, such tools lack the structural understanding of email content, and therefore cannot summarize and provide additional information for the content of mail.

By extracting deal content from email, and aligning the deal content with other data sources, deals can be recognized in email. As such, the deals may be summarized in a structural way, allowing deals to be filtered by fields/attributes such as price, discount, etc. Additional information not included in an original deal email may be added to the deal email, and/or the information in the original deal email may be updated with enhancement information. Deals may be ranked by user preferences (e.g., the user's location, other user demographics, etc.), and the user may be provided with recommendations for similar deals.

III. Example Computer Implementations

Commercial offer presentation system 108, deal manager 112, deal newsletter generator 114, user database 116, commercial offer presentation system 300, deal source interface 302, additional deal database 304, deal aligner 306, web crawler 308, deal categorizer 310, editorial tool 312, logger 318, deal ranker 320, deal enhancer 322, image retargeter 324, deal newsletter generator 800, deal summary page generator 802, map page generator 804, mail page generator 806, deal search interface page generator 808, flowchart 200, step 402, flowchart 600, step 702, flowchart 900, and/or any further systems, sub-systems, and/or components disclosed herein may be implemented in hardware, in any combination of hardware with software and/or firmware, and in software/firmware stored in a computer readable storage medium. For example, commercial offer presentation system 108, deal manager 112, deal newsletter generator 114, user database 116, commercial offer presentation system 300, deal source interface 302, additional deal database 304, deal aligner 306, web crawler 308, deal categorizer 310, editorial tool 312, logger 318, deal ranker 320, deal enhancer 322, image retargeter 324, deal newsletter generator 800, deal summary page generator 802, map page generator 804, mail page generator 806, deal search interface page generator 808, flowchart 200, step 402, flowchart 600, step 702, and/or flowchart 900 may be implemented as computer program code configured to be executed in one or more processors. Alternatively, commercial offer presentation system 108, deal manager 112, deal newsletter generator 114, user database 116, commercial offer presentation system 300, deal source interface 302, additional deal database 304, deal aligner 306, web crawler 308, deal categorizer 310, editorial tool 312, logger 318, deal ranker 320, deal enhancer 322, image retargeter 324, deal newsletter generator 800, deal summary page generator 802, map page generator 804, mail page generator 806, deal search interface page generator 808, flowchart 200, step 402, flowchart 600, step 702, and/or flowchart 900 may be implemented as hardware logic/electrical circuitry.

As described above, commercial offer presentation system 108, deal manager 112, mail server 110, commercial offer presentation system 300, editorial tool 312, deal newsletter generator 114, deal newsletter generator 800, deal summary page generator 802, map page generator 804, mail page generator 806, and deal search interface page generator 808 may generate one or more user interfaces. Such user interfaces may enable user input to be provided from one or more of any type of user interface elements provided by a computing device, including a keyboard, a thumb wheel, a pointing device, a roller ball, a stick pointer, a touch sensitive display, any number of virtual interface elements, a voice recognition system, etc. Graphical user interfaces (GUI) may be displayed in a display of the computing device, such as in a browser window generated by a web browser, an application window, or in other window type mentioned elsewhere herein or otherwise known.

Figure 14:
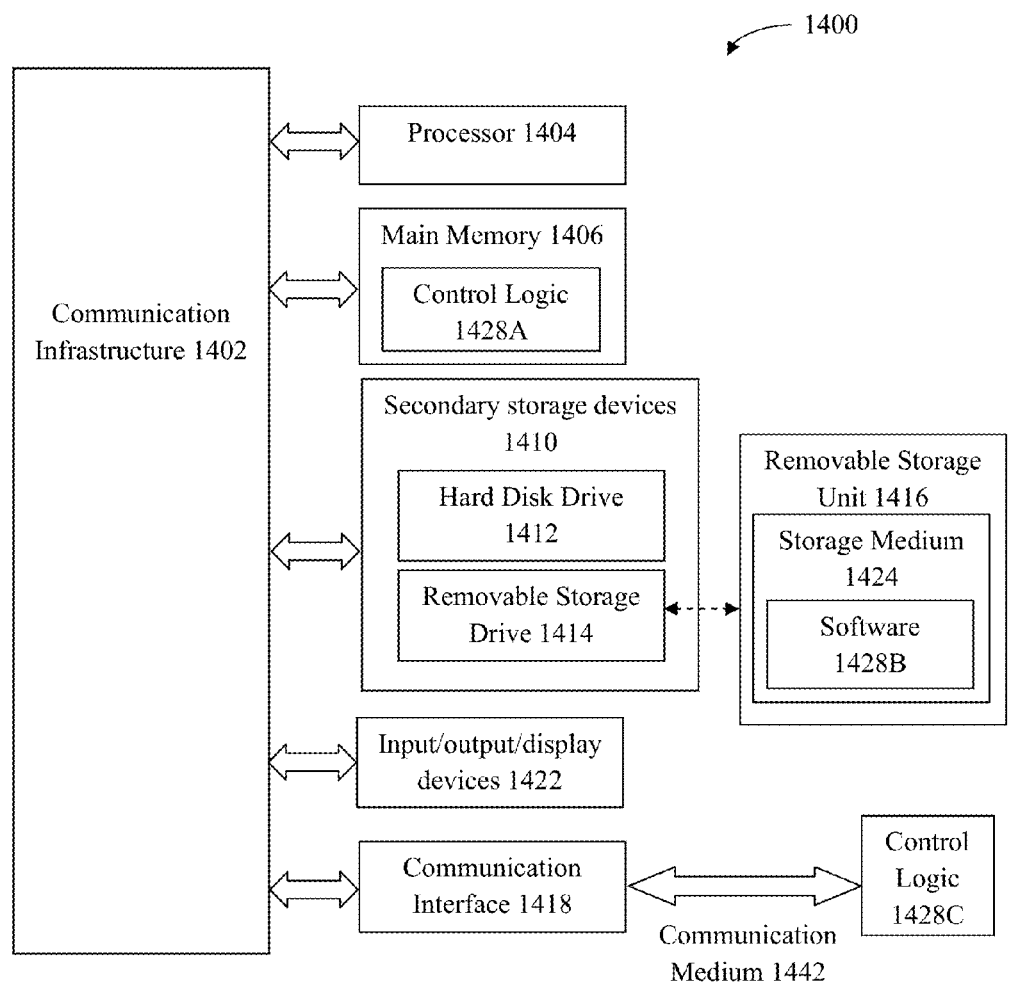
FIG. 14 is a block diagram of a computer in which embodiments may be implemented.

The embodiments described herein, including systems, methods/processes, and/or apparatuses, may be implemented using well known servers/computers, such as a computer 1400 shown in FIG. 14. For example, server(s) 102, user device 104, mail server 110, front end server(s) 314, back end server(s) 316, and any of the sub-systems or components contained therein may be implemented using one or more computers 1400.

Computer 1400 can be any commercially available and well known computer capable of performing the functions described herein, such as computers available from International Business Machines, Apple, Sun, HP, Dell, Cray, etc. Computer 1400 may be any type of computer, including a desktop computer, a server, etc.

Computer 1400 includes one or more processors (also called central processing units, or CPUs), such as a processor 1404. Processor 1404 is connected to a communication infrastructure 1402, such as a communication bus. In some embodiments, processor 1404 can simultaneously operate multiple computing threads.

Computer 1400 also includes a primary or main memory 1406, such as random access memory (RAM). Main memory 1406 has stored therein control logic 1428A (computer code or instructions), and data.

Computer 1400 also includes one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 may include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 includes a computer useable or readable storage medium 1424 having stored therein computer logic 1428B (computer instructions or code) and/or data. Removable storage unit 1416 represents a floppy disk, magnetic tape, compact disk, DVD, optical storage disk, or any other computer data storage device. Removable storage drive 1414 reads from and/or writes to removable storage unit 1416 in a well-known manner.

Computer 1400 also includes input/output/display devices 1422, such as monitors, keyboards, pointing devices, etc.

Computer 1400 further includes a communication or network interface 1418. Communication interface 1418 enables computer 1400 to communicate with remote devices. For example, communication interface 1418 allows computer 1400 to communicate over communication networks or mediums 1442 (representing a form of a computer useable or readable medium), such as LANs, WANs, the Internet, etc. Network interface 1418 may interface with remote sites or networks via wired or wireless connections.

Control logic 1428C may be transmitted to and from computer 1400 via the communication medium 1442.

Any apparatus or manufacture comprising a computer useable or readable medium (e.g., a computer-readable storage or recording medium) having control logic (computer instructions or code) stored therein is referred to herein as a computer program product or program storage device. This includes, but is not limited to, computer 1400, main memory 1406, secondary storage devices 1410, and removable storage unit 1416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media (computer-readable recording media) include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable storage media may store program modules that include computer program logic for implementing commercial offer presentation system 108, deal manager 112, deal newsletter generator 114, user database 116, commercial offer presentation system 300, deal source interface 302, additional deal database 304, deal aligner 306, web crawler 308, deal categorizer 310, editorial tool 312, logger 318, deal ranker 320, deal enhancer 322, image retargeter 324, deal newsletter generator 800, deal summary page generator 802, map page generator 804, mail page generator 806, deal search interface page generator 808, flowchart 200, step 402, flowchart 600, step 702, and/or flowchart 900 (including any step of flowcharts 200, 600, and 900), and/or further embodiments described herein. Embodiments of the invention are directed to computer program products comprising such logic (e.g., in the form of program code or instructions) stored on any computer useable medium. Such program code, when executed in one or more processors, causes a device to operate as described herein.

Note that such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

The invention can work with hardware, combinations of hardware with software/firmware, and/or operating system implementations other than those described herein. Any such implementations suitable for performing the functions described herein can be used.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
   receiving, by a processor, a first plurality of emails;
   determining, by the processor, from the first plurality of emails, a second plurality of emails, each email of the second plurality of emails received from a merchant web site and comprising a commercial offer for a user, the commercial offer comprising a coupon to encourage the user to purchase a product or service;
   comparing, by the processor, the web site to a list of predetermined sites to determine if the web site is a merchant site and to determine, by analyzing email content, that the determined emails comprise the commercial offers;
   when the web site is in the list of predetermined sites, determining that the web site is a merchant site and determining that the determined emails comprise the commercial offers;
   storing, by the processor, the determined emails in a deal folder for the user; and
   generating, by the processor, a deal newsletter that summarizes a plurality of commercial offers contained in at least a portion of the determined emails stored in the deal folder, the deal newsletter displaying portions of the commercial offers and comprising a map indicating deal locations, and a search interface that enables the user to search the commercial offers, the generating of the deal newsletter comprising:
   extracting, by the processor, commercial offer information from a corresponding email of the portion of the determined emails, generating, by the processor, a mail page of the deal newsletter that includes a plurality of deal summary snapshots in a first portion of the mail page, each deal summary snapshot including the extracted commercial offer information, receiving, by the processor, a selection of a deal summary snapshot in the plurality of deal summary snapshots, identifying, by the processor, deal locations in the extracted commercial offer information;

extracting, by the processor, the deal locations from the extracted commercial offer information; and generating, by the processor via a mapping tool, the map indicating the deal locations; and transmitting, by the processor to a computing device of the user for display, the generated deal newsletter.

2. The method of claim 1, further comprising:
transmitting information associated with the deal folder to the computing device for display.

3. The method of claim 1, wherein said generating a deal newsletter that summarizes commercial offers contained in at least a portion of the determined emails stored in the deal folder comprises:
receiving a request from the user for the deal newsletter; and
generating the deal newsletter in response to the received request.

4. The method of claim 1, wherein said generating a deal newsletter that summarizes commercial offers contained in at least a portion of the determined emails stored in the deal folder comprises:
extracting commercial offer information from a set of the emails stored in the deal folder; and
generating a deal summary page of the deal newsletter that includes a plurality of deal summary sections, each deal summary section including commercial offer information extracted from a corresponding email of the set of emails.

5. The method of claim 1, further comprising:
selecting a commercial offer of a plurality of commercial offers received from an additional commercial deal source; and
wherein said generating a deal newsletter that summarizes commercial offers contained in at least a portion of the determined emails stored in the deal folder comprises:
generating the deal newsletter to include the selected commercial offer.

6. The method of claim 1, wherein said generating a deal newsletter that summarizes commercial offers contained in at least a portion of the determined emails stored in the deal folder comprises:
generating a deal search page of the deal newsletter that includes the search interface for searching commercial offers contained in emails stored in the deal folder.

7. The method of claim 1, further comprising:
transmitting an interface to the computing device of the user for selecting an email stored in the deal folder for display; and
transmitting a modified display of the selected email by overlaying additional information on the selected email.

8. The method of claim 1, wherein said generating a deal newsletter that summarizes commercial offers contained in at least a portion of the determined emails stored in the deal folder comprises:
ranking commercial offers contained in emails stored in the deal folder.

9. A commercial offer presentation system, comprising:
a processor;
a storage medium for tangibly storing thereon program logic for execution by the processor, the stored program logic comprising:
deal manager logic executed by the processor for managing a set of emails received by the processor from a web site, each email in the set comprising a commercial offer directed to a user, the commercial offer comprising a coupon to encourage the user to purchase a product or service;
deal comparing logic executed by the processor for comparing the web site to a list of predetermined sites to determine if the web site is a merchant site and to determine, by analyzing email content, that the determined emails comprise the commercial offers, and, when the web site is in the list of predetermined sites, determining that the web site is a merchant site and determining that the determined emails comprise the commercial offers;
map page generator logic executed by the processor for generating a map indicating deal locations of the commercial offer;
search interface generator logic executed by the processor for generating a search interface to enable the user to search the commercial offers; and
deal newsletter generator logic executed by the processor for generating a deal newsletter for the user that summarizes a plurality of commercial offers contained in at least a portion of the emails, displays the map, and displays the search interface, the generating of the deal newsletter comprising:
extracting, by the processor, commercial offer information from a corresponding email of the portion of the emails,
generating, by the processor, a mail page of the deal newsletter that includes a plurality of deal summary snapshots in a first portion of the mail page, each deal summary snapshot including the extracted commercial offer information, and
receiving, by the processor, a selection of a deal summary snapshot in the plurality of deal summary snapshots, and transmitting, by the processor to a computing device of the user for display, the generated deal newsletter.

10. The commercial offer presentation system of claim 9, wherein the deal manager logic is further for managing the set of emails in a deal folder, and for generating deal folder information to transmit to the computing device of the user for display of the deal folder.

11. The commercial offer presentation system of claim 9, wherein the deal newsletter generator logic is for receiving a request from the user for the deal newsletter by the user interacting with a user interface of the computing device, and for generating the deal newsletter in response to the received request.

12. The commercial offer presentation system of claim 9, wherein the deal newsletter generator logic comprises:
deal summary page generator logic executed by the processor for generating a deal summary page of the deal newsletter that includes a plurality of deal summary sections, each deal summary section including commercial offer information extracted from a corresponding email of the set of emails;
mail page generator logic executed by the processor for generating a mail page of the deal newsletter that includes a plurality of deal summary snapshots in a first portion of the mail page, each deal summary snapshot including commercial offer information extracted from a corresponding email of the set of emails, and each deal summary snapshot selectable for transmitting to the computing device of the user for display of the corresponding email in a second portion of the mail page; and deal search interface page generator logic executed by the processor for generating a deal search page of the deal newsletter that includes the search interface for searching commercial offers contained in emails stored in the deal folder.

13. The commercial offer presentation system of claim 9, further comprising:

deal source interface logic executed by the processor for receiving a plurality of commercial offers from at least one additional commercial deal source, and for storing the received plurality of commercial offers in a deal database;

wherein the deal newsletter generator logic for generating the deal newsletter for the user comprises at least one commercial offer selected from the commercial offers stored in the deal database.

14. The commercial offer presentation system of claim 9, further comprising:

deal enhancer logic executed by the processor for modifying display of an email selected for display by overlaying additional information on the displayed selected email; and deal ranker logic executed by the processor for ranking commercial offers contained in the emails for the user.

15. A non-transitory computer readable storage medium having computer program instructions embodied in said computer readable storage medium for enabling a processor to provide deals for display, the computer program instructions comprising the steps of:

generating, by the processor, a deal newsletter for a user that summarizes a plurality of commercial offers contained in a plurality of emails received by the processor, the commercial offers each comprising a coupon to encourage a user to purchase a product or service, the plurality of emails received from a web site that is on a list of predetermined sites, the generating of the deal newsletter comprising:

extracting, by the processor, commercial offer information from a corresponding email of the portion of the plurality of emails by analyzing the content of the email, generating, by the processor, a mail page of the deal newsletter that includes a plurality of deal summary snapshots in a first portion of the mail page, each deal summary snapshot including the extracted commercial offer information, receiving, by the processor, a selection of a deal summary snapshot in the plurality of deal summary snapshots;

identifying, by the processor, deal locations in the extracted commercial offer information;

extracting, by the processor, the deal locations from the extracted commercial offer information;

generating, by the processor via a mapping tool, a map indicating the deal locations; and generating, by the processor, an interface that enables the user to search the commercial offers; and transmitting, by the processor, the generated deal newsletter to a computing device associated with the user for display.

16. The non-transitory computer readable storage medium of claim 15, wherein the instructions further comprise:

determining, by the processor, the emails that contain commercial offers from a plurality of emails directed to the user; and storing, by the processor, the determined emails in a deal folder for the user;

wherein the deal newsletter is generated based on the emails stored in the deal folder for the user.

17. The non-transitory computer readable storage medium of claim 15, further comprising:

generating, by the processor, a deal summary page of the deal newsletter that includes a plurality of deal summary sections, each deal summary section including commercial offer information extracted from a corresponding email of the plurality of emails; and generating, by the processor, a mail page of the deal newsletter that includes a plurality of deal summary snapshots in a first portion of the mail page, each deal summary snapshot including commercial offer information extracted from a corresponding email of the plurality of emails, and each deal summary snapshot selectable for transmitting to a computing device of the user for display of the corresponding email in a second portion of the mail page.

18. The non-transitory computer readable storage medium of claim 15, further comprising:

modifying, by the processor, display of an email selected for display by overlaying additional information on the displayed selected email; and ranking, by the processor, commercial offers contained in the emails for the user.

* * * * *